United States Patent
Narasimhan et al.

(10) Patent No.: US 10,878,477 B2
(45) Date of Patent: Dec. 29, 2020

(54) PURCHASE RECOMMENDATION SYSTEM

(71) Applicant: PAYPAL, INC., San Jose, CA (US)

(72) Inventors: Srivathsan Narasimhan, San Jose, CA (US); Abhijeet Ranadive, San Jose, CA (US); Teddy Vincent Toms, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 748 days.

(21) Appl. No.: 14/985,538

(22) Filed: Dec. 31, 2015

(65) Prior Publication Data
US 2017/0193584 A1 Jul. 6, 2017

(51) Int. Cl.
G06Q 30/06 (2012.01)
G06Q 30/02 (2012.01)

(52) U.S. Cl.
CPC ..... *G06Q 30/0631* (2013.01); *G06Q 30/0243* (2013.01)

(58) Field of Classification Search
CPC ................ G06Q 30/0631; G06Q 30/0243
USPC ..................................... 705/14.42
See application file for complete search history.

(56) References Cited

U.S. PATENT DOCUMENTS

| | | | | |
|---|---|---|---|---|
| 8,515,819 | B2 * | 8/2013 | Crucs ................ | G06Q 30/0631 705/26.1 |
| 2008/0133349 | A1 * | 6/2008 | Nazer ................ | G06Q 20/12 705/14.39 |
| 2011/0178897 | A1 | 7/2011 | Balasubramanian et al. | |
| 2012/0166261 | A1 | 6/2012 | Velusamy et al. | |
| 2013/0218721 | A1 * | 8/2013 | Borhan ............... | G06Q 20/322 705/26.41 |
| 2014/0257920 | A1 * | 9/2014 | Gilman .............. | G06Q 30/0255 705/7.29 |
| 2015/0154588 | A1 * | 6/2015 | Purves ............... | G06Q 30/0641 705/14.27 |
| 2015/0317720 | A1 * | 11/2015 | Ramaratnam ......... | G06Q 20/20 705/21 |

* cited by examiner

*Primary Examiner* — Azam A Ansari
(74) *Attorney, Agent, or Firm* — Haynes and Boone, LLP

(57) ABSTRACT

Systems and methods for providing purchase recommendations include determining a shopping list including a plurality of items associated with a customer. The financial information that is associated with the customer is retrieved from a non-transitory memory. At least one selected item from the shopping list is determined based on the financial information. A purchase recommendation including the at least one selected item is generated. The purchase recommendation is provided for display on at least one customer device.

20 Claims, 21 Drawing Sheets

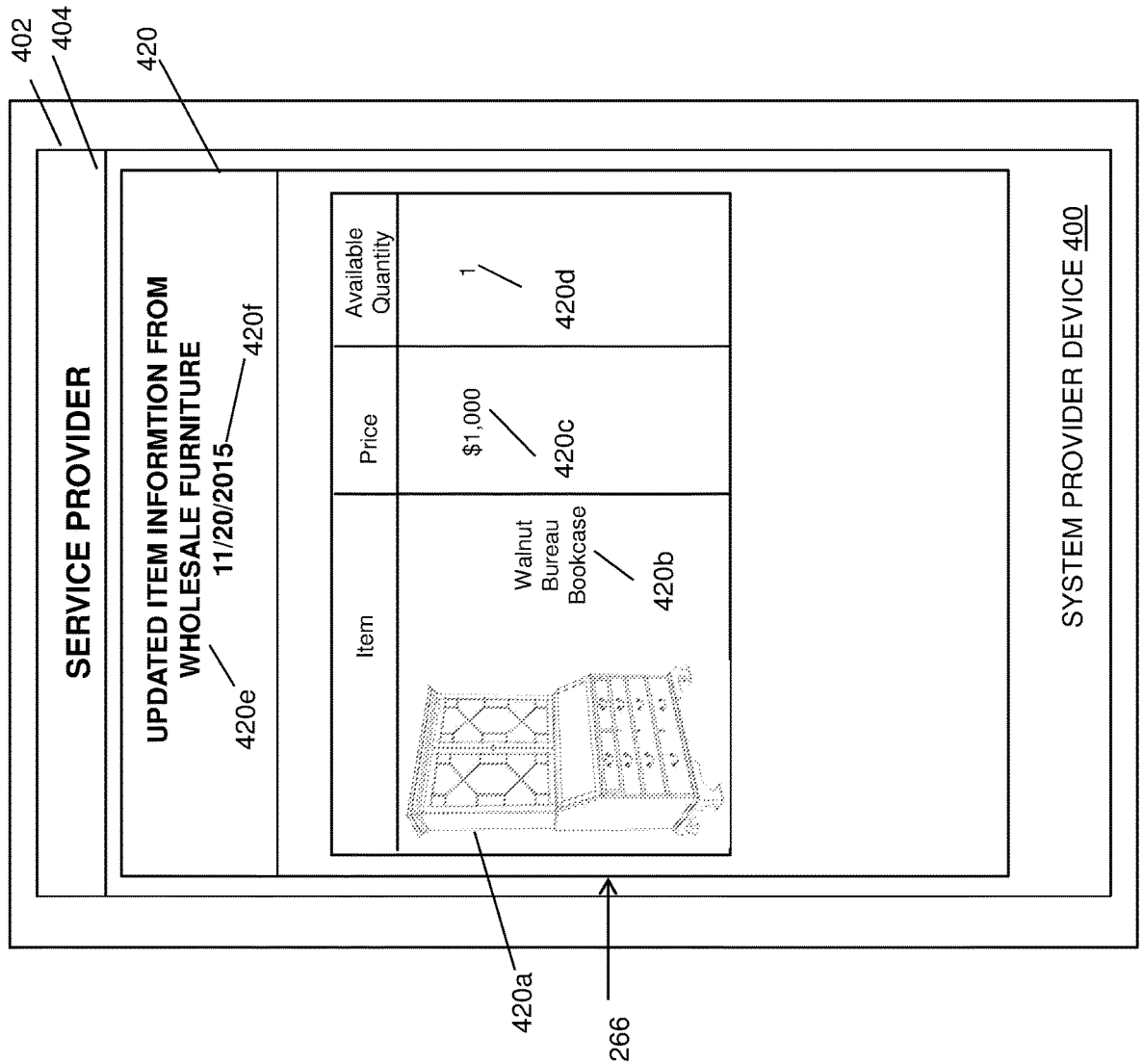

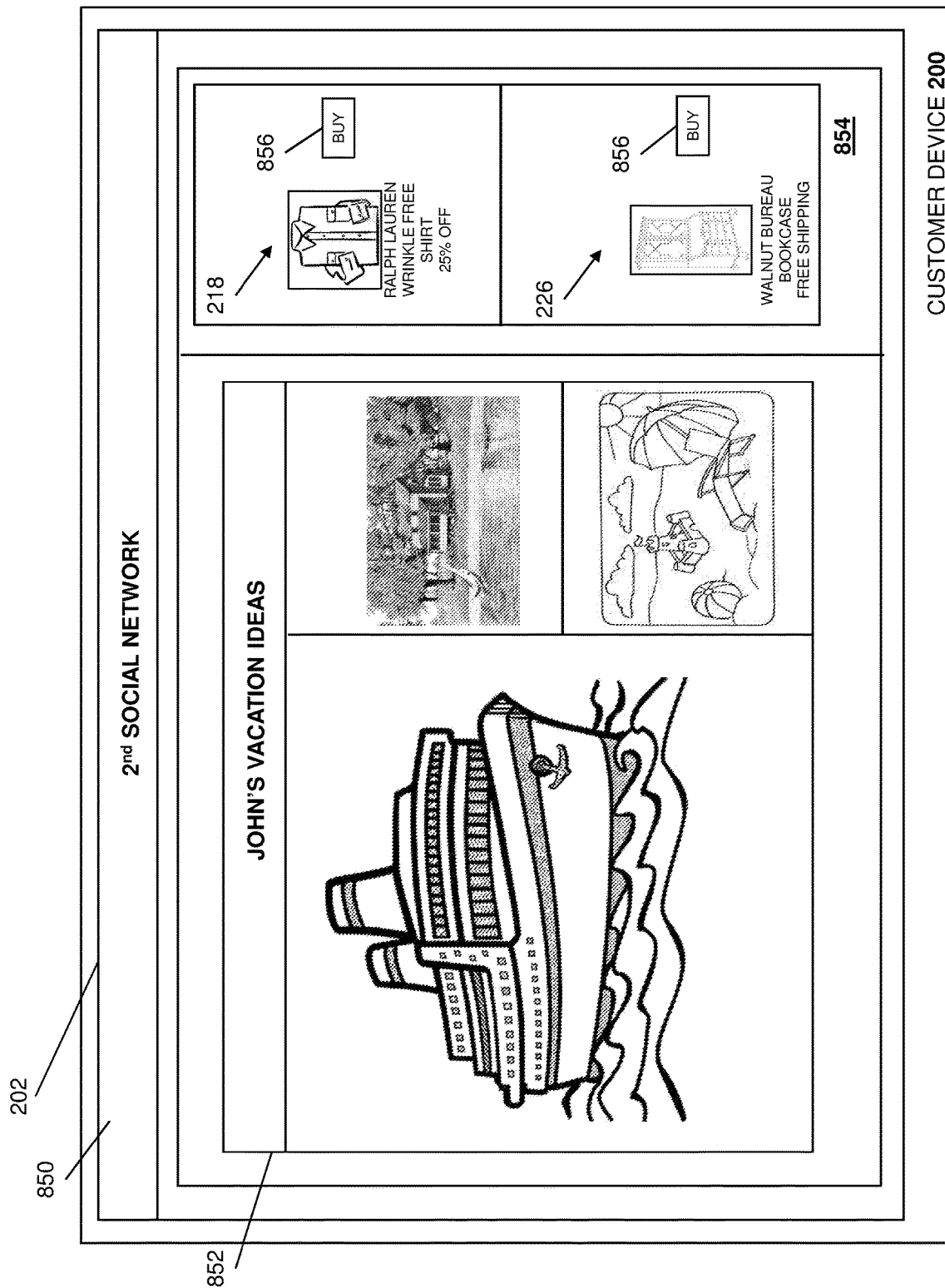

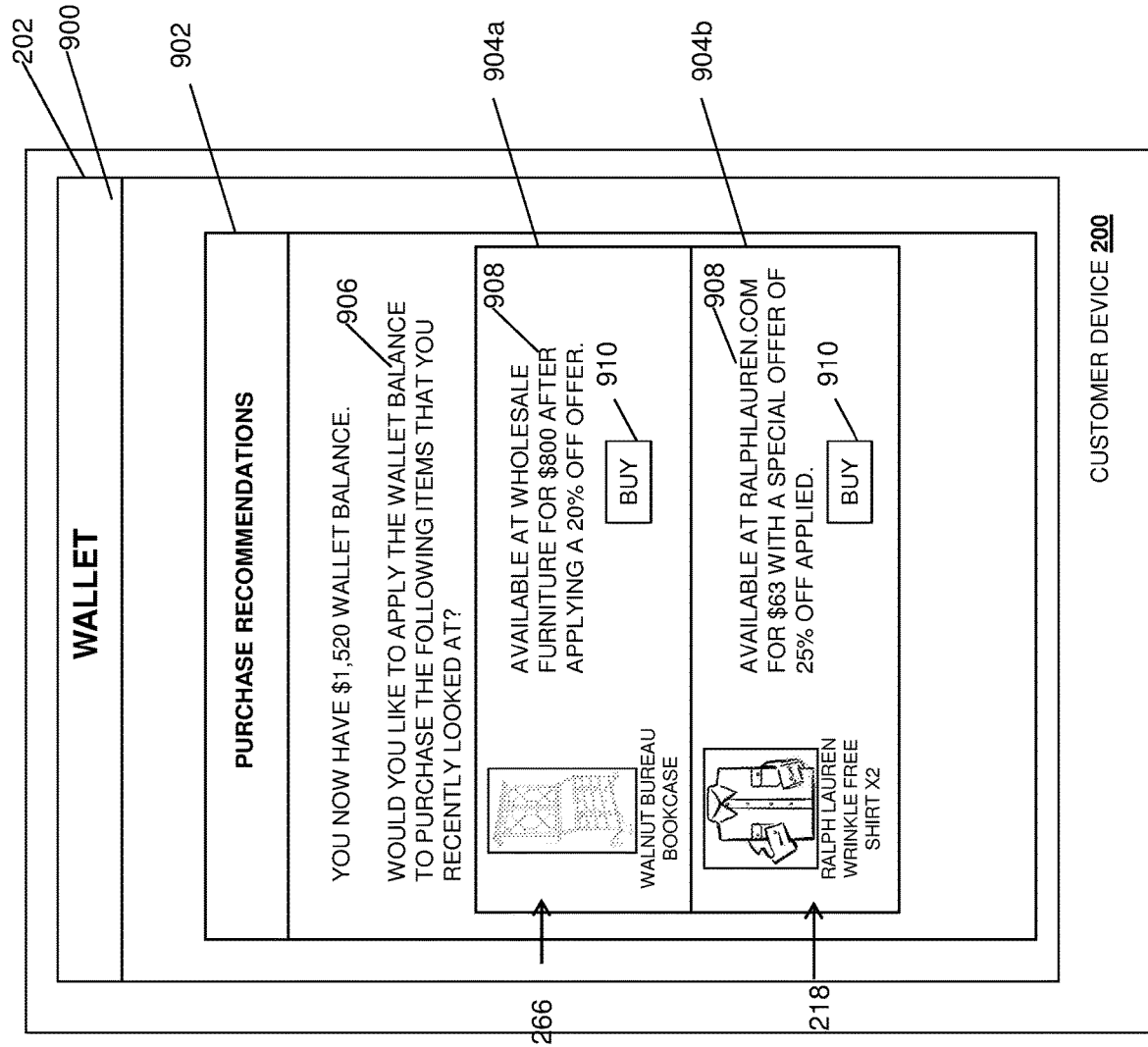

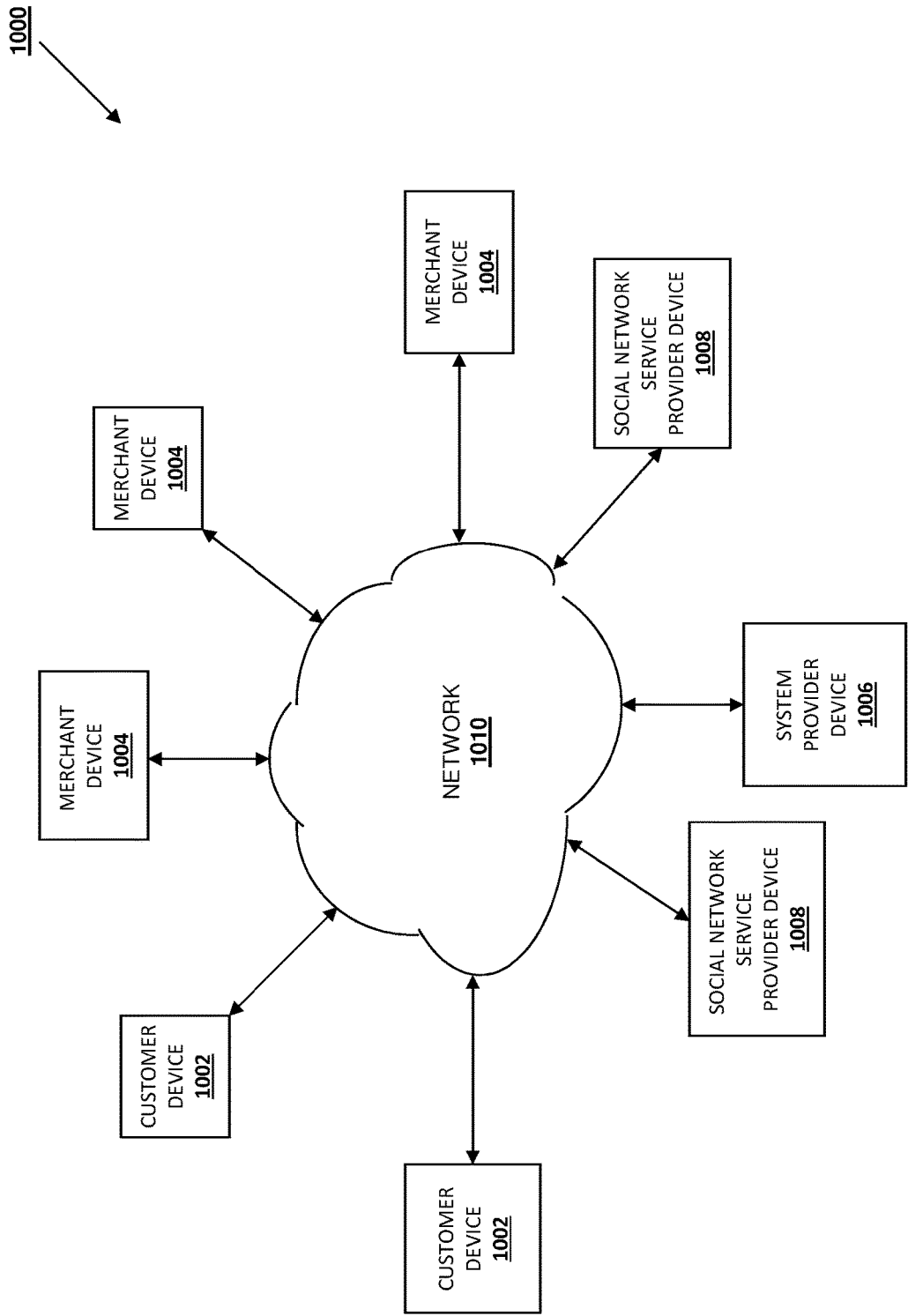

PURCHASE RECOMMENDATION SYSTEM

BACKGROUND

Field of the Disclosure

The present disclosure generally relates to purchase transactions conducted over electronic networks and more particularly to purchase recommendation systems for providing purchase recommendations including incentives for the customer to complete the recommended purchase.

Related Art

More and more consumers are conducting transactions, such as purchasing items and services, over electronic networks such as, for example, the Internet. Consumers routinely purchase products and services from merchants and individuals alike. The transactions may take place directly between a physical or on-line merchant or retailer and the consumer, and payment is typically made by entering credit card or other financial information. Transactions may also take place with the aid of an on-line or mobile payment service provider such as, for example, PayPal, Inc. of San Jose, Calif. Such payment service providers can make transactions easier and safer for the parties involved. Purchasing with the assistance of a payment service provider from the convenience of virtually anywhere using a mobile device is one main reason why on-line and mobile purchases are growing very quickly.

Typically, when shopping at a particular website, users select items to view or purchase by selecting a link or other indicator for a specific item. The selected items may then be stored in some type of virtual shopping cart. When done shopping, the customer is directed to checkout to provide some form of payment for the selected items. At various point in the process, the customer may withdraw from purchasing the selected items or otherwise abandon the checkout prior to payment such that the selected items stored in the shopping cart are not purchased. When this occurs, the shopping cart and any associated items may be deleted or otherwise discarded from storage because the customer failed to complete the purchase transaction. As such, if the user subsequently wishes to purchase those items, they must go through the process again to select those items, have them stored in a new shopping cart, and complete the purchase. Such inconveniences can discourage users from making purchases and lead to lost sales for merchants.

Thus, there is a need to improve the process of providing for the purchase of items that were previously selected but not purchased in online purchase transactions.

BRIEF DESCRIPTION OF THE FIGURES

FIG. 4C is a schematic view illustrating an embodiment of a system provider device displaying updated item information;

FIG. 8B is a screen shot illustrating an embodiment of a customer device displaying a consolidated shopping cart screen through a social network;

FIG. 9A is a screen shot illustrating an embodiment of a customer device displaying a purchase recommendation screen;

FIG. 10 is a schematic view illustrating an embodiment of a networked system;

Figure 1:
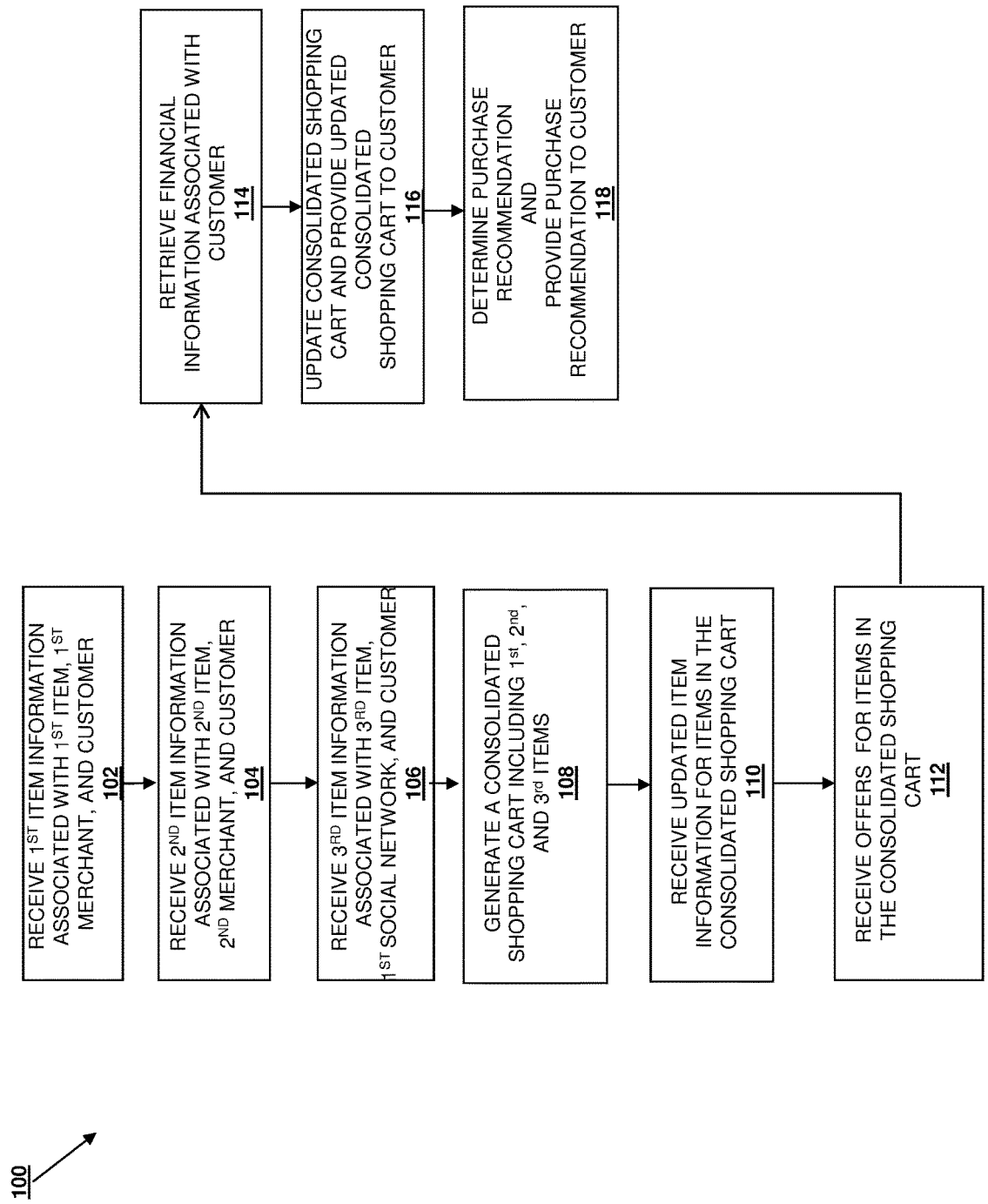
FIG. 1 is a flow chart illustrating an embodiment of a method for providing purchase abandonment conversion.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure provides systems and methods for providing a purchase abandonment conversion system. As discussed above, customers may be inconvenienced and merchants may lose sales when a customer fails to complete or otherwise abandons a purchase transaction before or during a checkout process. However, in embodiments of the systems and methods described herein, a system provider (e.g., the payment service provider) assists in purchase transactions between merchants and customers, which may allow the system provider to use the abandoned shopping carts from one or more merchants to provide a new shopping list (also referred to as a consolidated shopping cart below) that allows a user to quickly view and purchase previously selected items for which a checkout/purchasing transaction was not completed. Furthermore, the system provider may update the consolidated shopping cart using updated item information and offers from merchants and financial information (e.g., account balance information, rewards information, budget information) of the customer. For example, the system provider may generate and update a conversion profile of the customer, assist in providing offers from merchants to customers based on the conversion profile of the customer, and make purchase recommendations to the customer based on the received offers. The determination of the offers may include determining an offer that is most likely to provide the highest conversation rate for the items in the consolidated shopping cart based on the conversion profile of the customer. The system may also determine purchase recommendations using financial information of the customer, and provide the determined purchase recommendations to the customer. The determination of purchase recommendations may include determining available funding resources (e.g., account balance, reward balance, etc.) and remaining budgets (e.g., remaining budget for a particular category), and selecting the items from the consolidated shopping cart based on the available funding resources and the remaining budget.

Referring now to FIG. 1, an embodiment of a method 100 for providing purchase abandonment conversion is illustrated. In the embodiments discussed below, a payment service provider such as, for example, PayPal, Inc. of San Jose, Calif. is the system provider and operates a system provider device (e.g., payment service provider device) to help "convert" items associated with abandoned shopping carts by allowing for the quick and easy purchase of those items if a user subsequently determines they would like to purchase those items. However, one of skill in the art in possession of the present disclosure will recognize that a variety of other system providers such as, for example, discount providers, marketplace providers, merchants, and/or other entities will benefit from the teachings herein and thus fall within the scope of the present disclosure.

Figure 2A:
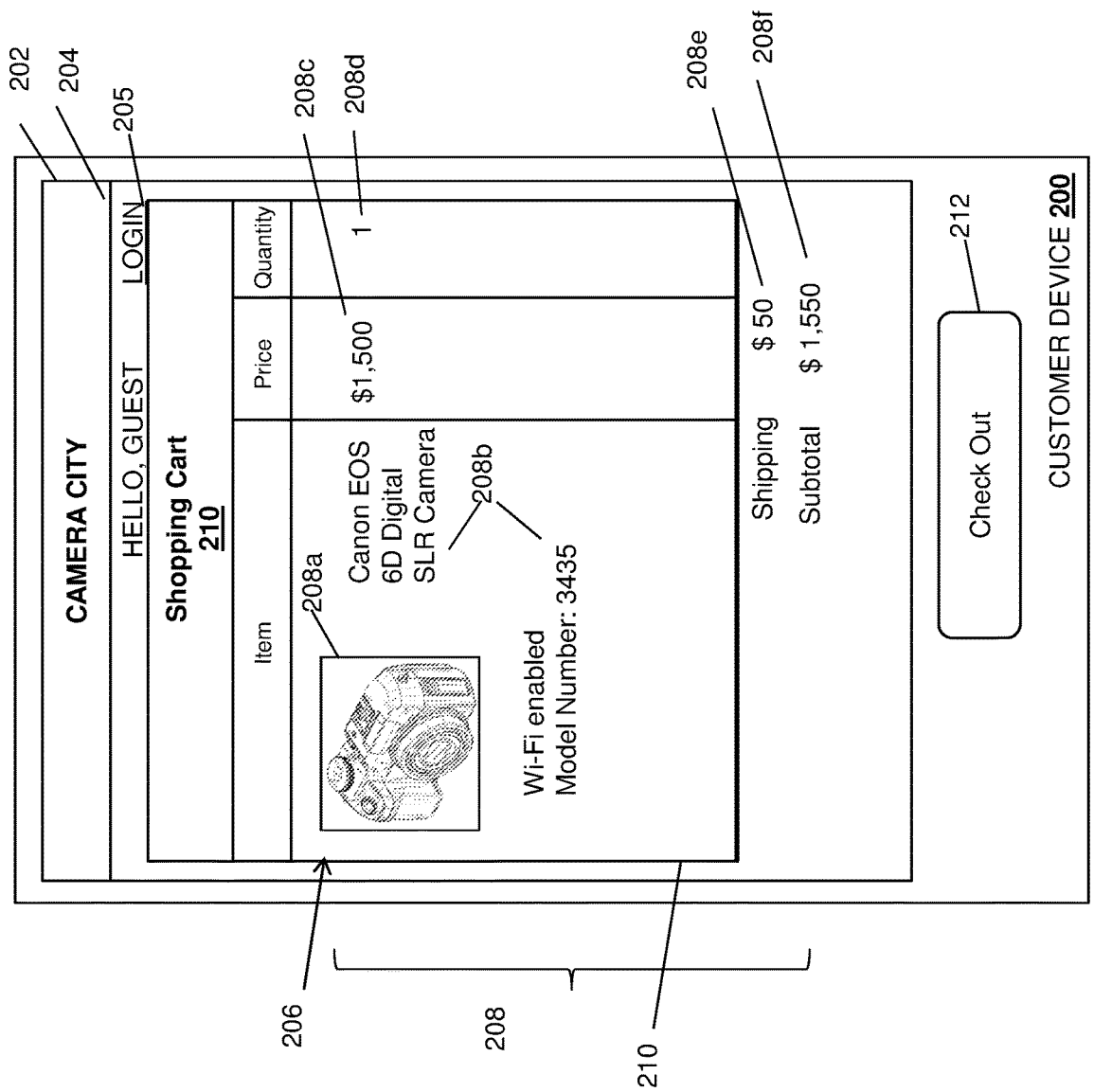
FIG. 2A is a screen shot illustrating an embodiment of a customer device displaying a shopping cart screen.

The method 100 may begin at block 102, where the system provider receives abandoned cart information from a customer device 200. The abandoned cart information may include item information associated with one or more items from one or more shopping carts that were abandoned by the customer at one or more merchants. Referring now to FIG. 2A, illustrated is an example of a shopping cart screen 204 displayed on the customer device 200 when a customer is shopping online at a merchant's website (e.g., "Camera City"). In the illustrated example, the customer has not signed in to the merchant's website using the login button 205 (e.g., by providing a username and password to access a registered account with the merchant), and is browsing the merchant's website as a guest (e.g., non-registered or partially anonymous user that may only be identified by information such as a Media Access Control (MAC) address, an Internet Protocol (IP) address, or other user device identifier). In the particular illustrated example of FIG. 2A, the customer has placed an item 206 in a shopping cart 210. In some embodiments, the customer device 200 may store shopping cart information associated with the shopping cart 210, and each time the customer adds a new item to the shopping cart 210 or removes an item from the shopping cart 210, the customer device 200 may update the shopping cart information with the change(s). In some embodiments, the shopping cart information may include item information associated with each item in the shopping cart 210. For example, the shopping cart information may include item information 208 for the item 206. The item information 208 may include an item image 208a (e.g., an image of the item 206), item details 208b (e.g., "Canon EOS 6D Digital SLR Camera Wi-Fi enabled Model Number: 3435"), price information 208c (e.g., "$1,500"), required quantity 208d (e.g., "1"), shipping cost information 208e (e.g., "$50"), subtotal information 208f (e.g., "$1,550"), origination information (e.g., "Camera City"), merchant information (e.g., "Camera City"), and/or other item information known in the art.

In some embodiments, the customer may abandon the shopping cart 210 before checking out or during the checkout process. In some embodiments, the customer device 200 may determine that the shopping cart 210 has been abandoned (e.g., by detecting that the consumer has navigated to a different web site, closed the browser tab or window, in response to a time period passing without completing a checkout process, or in response to any other abandonment criteria known in the art), and send the shopping cart information including any item information that was collected over a network such as, for example, the Internet. For example, the customer device 200 may send the item information 208 to a system provider device that operates to provide the purchase abandonment conversion system of the present disclosure (e.g., a payment service provider device operated by a payment service system provider, a third-party system provider device operated by a third-party system provider, and/or any other provider of the purchase abandonment conversion system).

In some embodiments, the customer may use the customer device 200 to provide the system provider device with customer information of the customer over the network. For example, the customer information of the customer may include a user name, a user identification number, a user account number, a user password, login information of various social networks and/or merchants, user device identifiers, and/or a variety of other information known in the art for associating the customer with a customer account. In some embodiments, the customer may sign into an account with the system provider device in order to access the customer information provided to the system provider device.

Figure 2B:
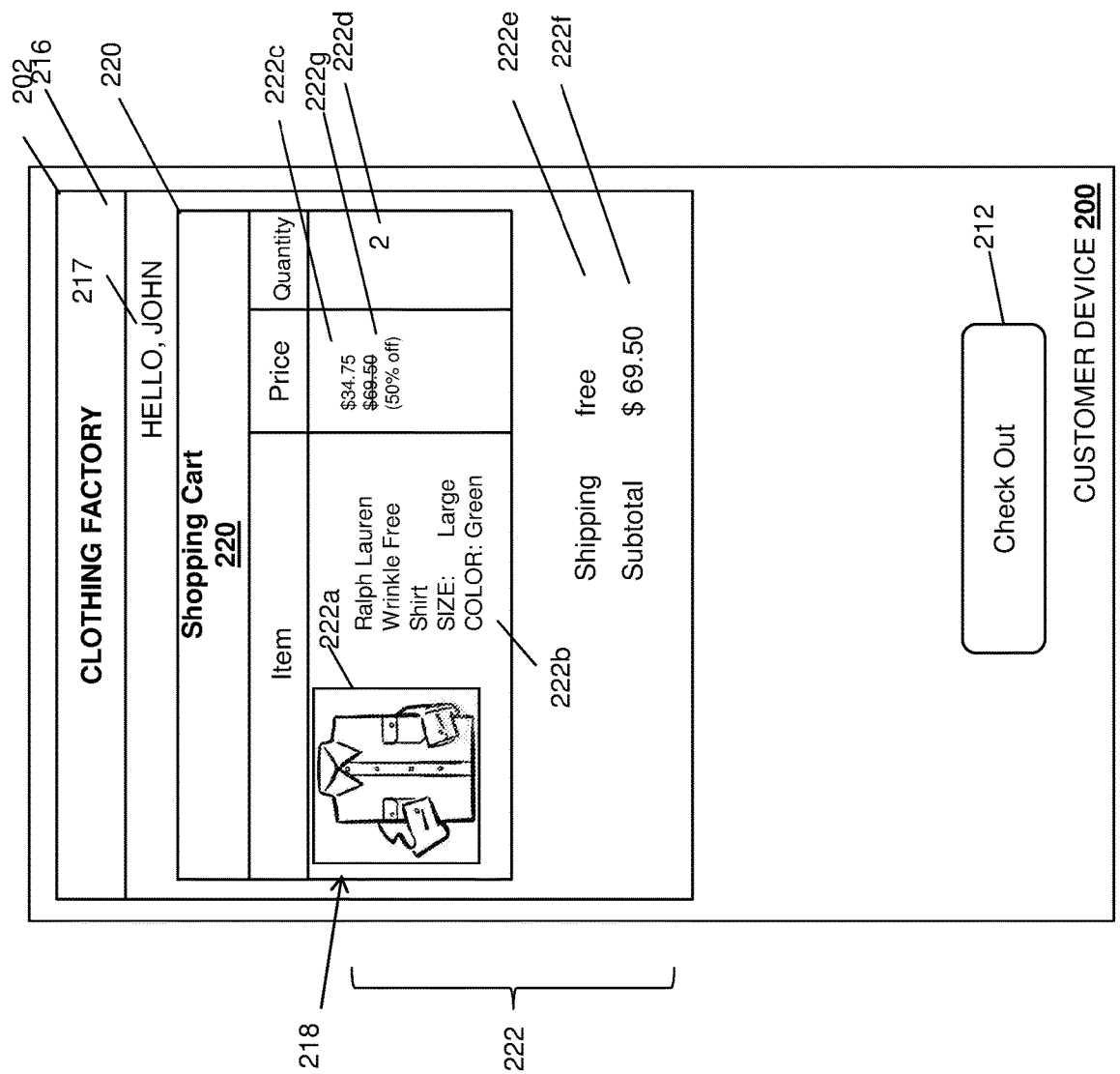
FIG. 2B is a screen shot illustrating an embodiment of a customer device displaying a shopping cart screen.

Referring back to FIG. 1, the method 100 proceeds to block 104, where the system provider device receives abandoned shopping cart information from a merchant device associated with a merchant. As discussed above, a shopping cart generated by a customer with a merchant may be abandoned by that customer. Referring now to FIG. 2B, illustrated is an example of a shopping cart screen 216 displayed on a display device 202 of the customer device 200 when a customer is shopping online at a merchant's website (e.g., "Clothing Factory"). In the illustrated example, the customer has signed into an account 217 (e.g., "John") with the merchant device. In the particular illustrated example of FIG. 2B, the customer has placed an item 218 in a shopping cart 220. In some embodiments, a merchant device associated with the merchant may reserve, store, or otherwise record the item 218 that was placed in the shopping cart 220 with the customer that placed it there.

In some embodiments, the merchant device may determine whether to store shopping cart information associated with the shopping cart 220 based on the login status of the customer. For example, if the customer is browsing the merchant's website as a guest or otherwise partially anonymous user as discussed above, instead of the merchant device storing the shopping cart information in association with any information available about that guest or otherwise partially anonymous user as discussed above, the merchant device may determine not to store the shopping cart information associated with the shopping cart 220. Alternatively, if the customer has signed into an account that is registered with the merchant device, the merchant device may store the shopping cart information, and associate the stored shopping cart information with the customer. Each time the customer adds a new item to the shopping cart 220 or removes an item from the shopping cart 220, the merchant device may update the stored shopping cart information. The shopping cart information associated with the shopping cart 220 may include item information associated with each item in the shopping cart 220. For example, the shopping cart information may include item information 222 associated with the item 218, which may include item image 222*a* (e.g., an image of the item 218), item details 222*b* (e.g., "Ralph Lauren Wrinkle Free Shirt, Size Large, Color Green"), price information 222*c* (e.g., "$34.75"), required quantity 222*d* (e.g., "2"), shipping cost information 222*e* (e.g., "free"), subtotal information 222*f* (e.g., "$69.50"), origination information (e.g., "Clothing Factory"), merchant information (e.g., "Clothing Factory"), and discount information 222*g* (e.g. "50% off").

In some embodiments, the shopping cart information may include information that may be used (e.g., by the system provider device or the merchant device) to recreate the shopping cart with the merchant. For example, the shopping cart information may include an identifier identifying the shopping cart 220 at the merchant, a URL link adapted to direct a customer to the shopping cart 220 at the merchant, identifiers about each items placed in the shopping cart, any metadata associated with the creation of the shopping cart and/or the items stored therein, and/or any other information known in the art that may be used to recreate the shopping cart 220.

In some embodiments, the merchant device may determine that the customer has abandoned the shopping cart 220. For example, a merchant device providing the merchant's website may update a cookie (also referred to as a heartbeat cookie below) on the customer device 200 at a given interval, e.g., every 500 milliseconds. In some embodiments, the heartbeat cookie may be given a time-to-live, e.g., of one second. If the customer navigates away from the merchant's website, the heartbeat cookie may expire without being replaced by a new cookie and, in response, the merchant device may determine that the customer has abandoned the shopping cart 220 by detecting the absence of a heartbeat cookie in the customer device 200. In another example, the merchant device may determine that the shopping cart 220 is abandoned by detecting that a session for the customer has timed out. In some embodiments, after determining that the shopping cart 220 has been abandoned, the merchant device may release the reserved items back to the inventory and save the shopping cart information including the item information 222 (e.g., in an abandoned shopping cart database coupled to the merchant device).

In some embodiments, the merchant device may send the shopping cart information including the item information over a network such as, for example, the Internet. For example, the merchant device may send the item information 222 to a system provider device that operates to provide the purchase abandonment conversion system.

Figure 2C:
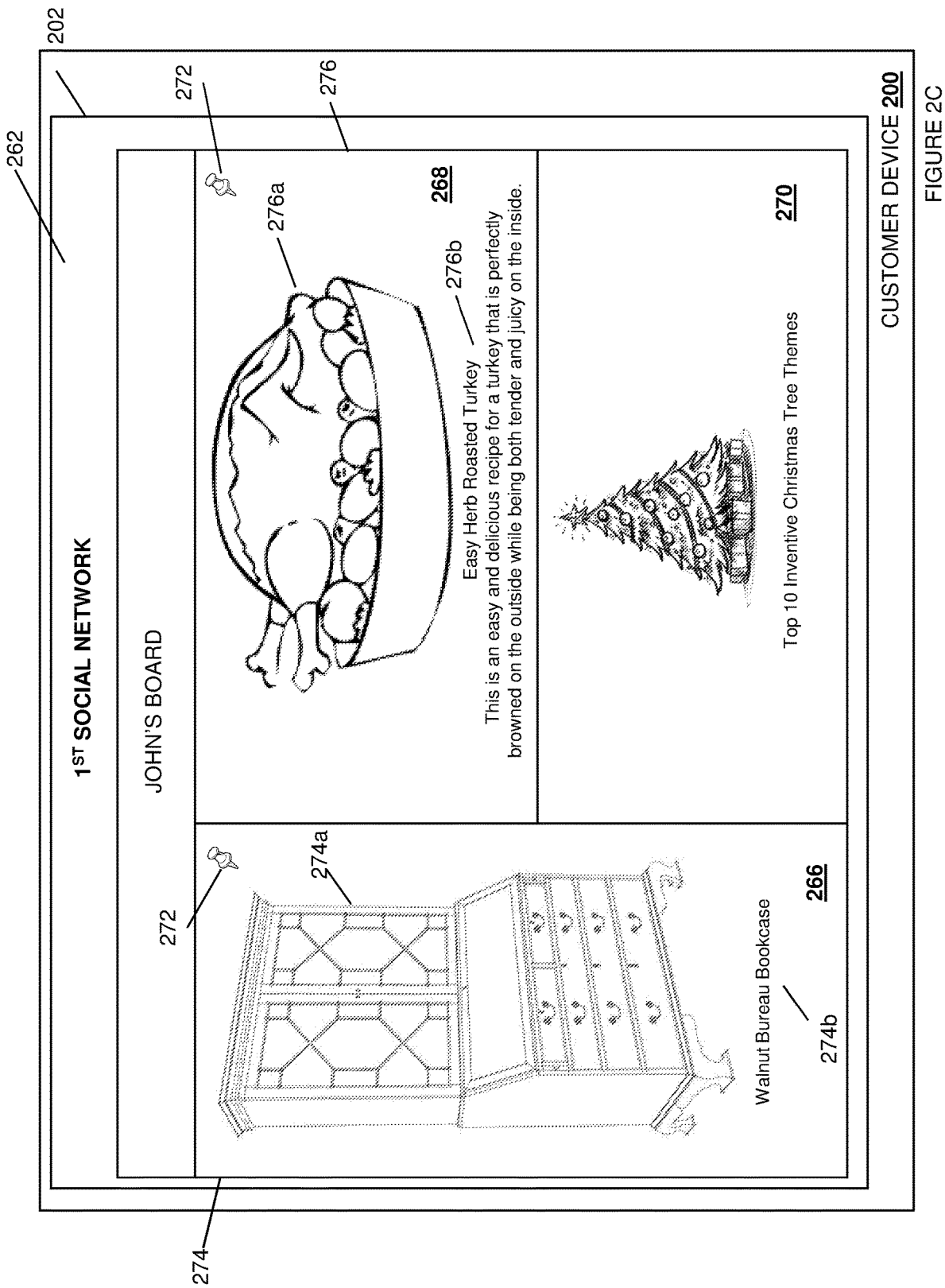
FIG. 2C is a screen shot illustrating an embodiment of a customer device displaying a social network screen.

Referring now to FIG. 1, the method 100 proceeds to block 106, where item information associated with one or more items of interest in a social network is received by the system provider device. Referring to FIG. 2C, illustrated is an example of a social network screen 260 displayed on a display device 202 of the customer device 200. The social network screen 206 includes a board section 262 (e.g., "JOHN'S BOARD") displaying items 266, 268, and 270 that may have been identified in a social network (e.g., "1$^{st}$ Social Network") by a user. In an example, items 266, 268, and 270 may be Pins on Pinterest, an application provided by Pinterest, Inc. of San Francisco, Calif. In some embodiments, the board section 262 may include interest indicators 272 for the items in which the customer has indicated an interest (e.g., by selecting a "Pin It" button provided by the social network). In the embodiment illustrated in FIG. 2C, for example, an interest indicator 272 is provided for each of the items 266 and 268 (which may also be referred to as items of interest 266 and 268 hereinafter), but not for the item 270.

In some embodiments, the system provider device may retrieve, from a social network device associated with a social network service provider, item information associated with the items of interest 266 and 268. For example, the retrieved item information may include item information 274 associated with the item 266. The item information 274 may include an item image 274*a* (e.g., an image of the item 266), item details 274*b* (e.g., "Walnut Bureau Bookcase"), and origination information (e.g., "1$^{st}$ Social Network"). For further example, the retrieved item information may include item information 276 associated with the item 268. The item information 276 may include an item image 276*a* (e.g., an image of the item 268), item details 276*b* (e.g., "Easy Herb Roasted Turkey Recipe"), and origination information (e.g., "1$^{st}$ Social Network").

While the collection of item information associated with items of interest may occur online as discussed above (e.g., a customer using a customer device such as a home computer to visit the merchant through a merchant website or application and abandon the shopping cart at the merchant website or application), such item information collection may also occur at a physical merchant location or any other physical location (e.g., with the assistance of a sales agent entering such item information into a merchant device in association with a loyalty card that includes the customer identity), and/or in a variety of other manners known in the art. In various embodiments, the items of interest may include items the customer has loaded into a shopping cart, items that the customer has browsed, items that the customer has saved to a wish list, items the customer has posted to a social network profile, and/or any items that the customer has indicated an interest in any of a variety of manners known in the art.

Figure 3:
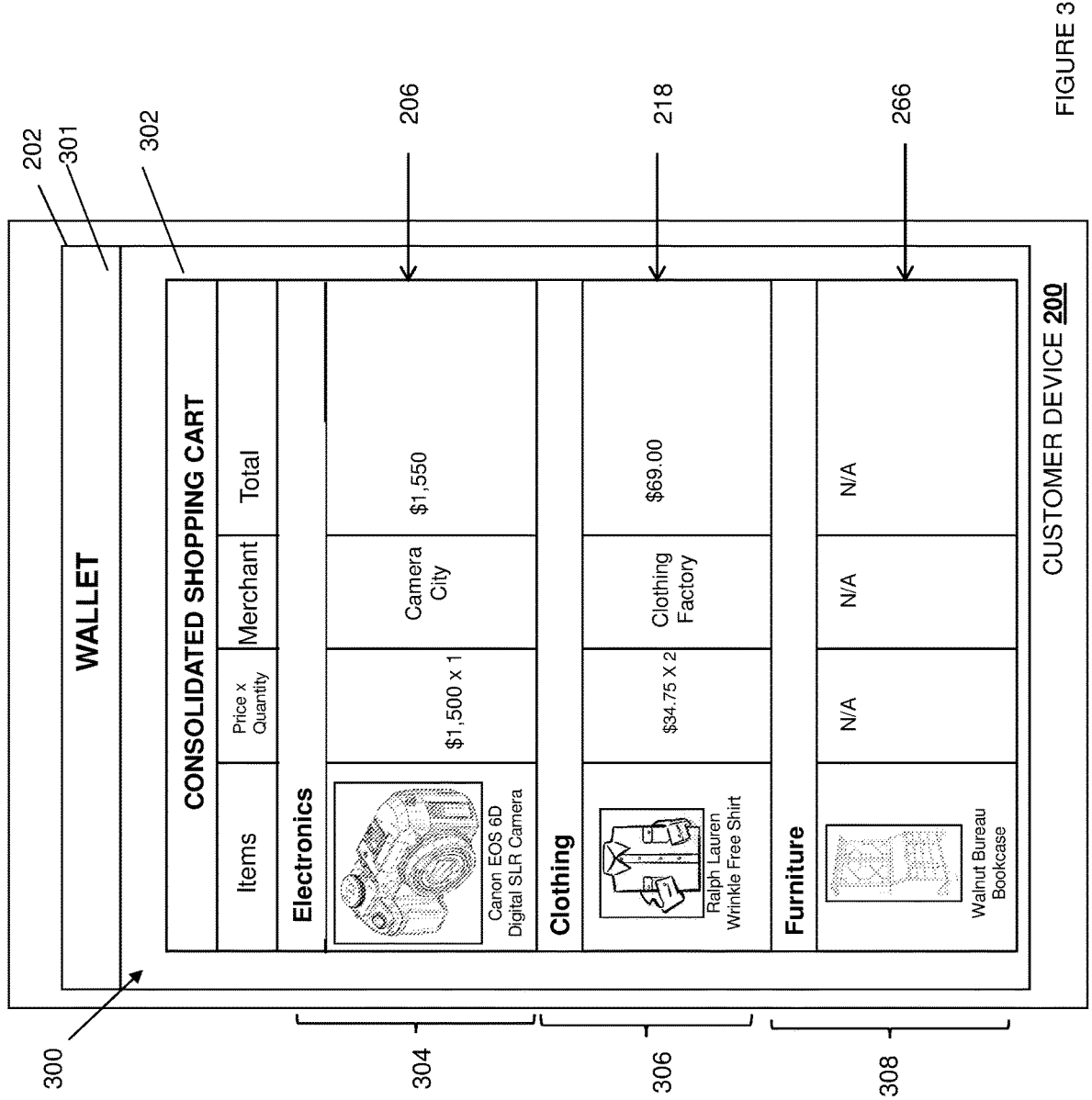
FIG. 3 is a screen shot illustrating an embodiment of a customer device displaying a consolidated shopping cart screen.

Referring back to FIG. 1, the method 100 proceeds to block 108, where the item information associated with the items of interest may be analyzed and used to generate a consolidated shopping cart 300. Referring to FIG. 3, illustrated is an embodiment of the customer device 200 that includes the display device 202 displaying a consolidated shopping cart screen 301 displaying the consolidated shopping cart 300. In some embodiments, the consolidated shopping screen 301 is provided through an application (e.g., a digital wallet application) provided by a system provider such as, for example, PayPal Inc. of San Jose, Calif. The consolidated shopping cart screen 301 includes a consolidated shopping cart section 302 including categories sections corresponding to categories 304, 306, and 308. Each category section may include the items that belong to the corresponding category.

In some embodiments, the system provider device may associate the particular item with a category of the consolidated shopping cart (e.g., based on the item details, the origination information, the merchant information, and/or a variety of other item information known in the art). For example, the system provider device may determine that the associated item 206 belongs to the category 304 (e.g., "Electronics") based on the item details 208*b* (e.g., including "Camera"). For further example, the system provider device may determine that the associated item 218 belongs to a category 306 (e.g., "Clothing") based on the merchant information (e.g., according to a predetermined association between a merchant "Clothing Factory" and a category "Clothing").

In some embodiments, the system provider device may analyze the item information without merchant information to determine whether the associated item is an item for purchase (e.g., based on the item details and/or a variety of other item information known in the art). In one example, the system provider device may determine the item 266 is an item for purchase based on the item details 274*b* (e.g., a description including "Bookcase"). The system provider device may then determine that the item 266 belongs to a category 308 (e.g., "Furniture") based on the item details 274*b* (e.g., a description including "Bookcase"). In the specific embodiment illustrated in FIG. 3, some information for the item 266 (e.g., price information, merchant information, total cost information) may not be available. In another example, the system provider device may determine the item 268 is not an item for purchase based on the item details 276*b* (e.g., a description including "Recipe"), and thus the system provider device may not add the item 268 to the consolidated shopping cart 300.

Referring back to FIG. 1, the method proceeds to block 110, where the system provider device may receive updated item information for items in the consolidated shopping cart. In some embodiments, subsequent to receiving information about item(s) in one or more abandoned shopping carts, the system provider device may send item update requests associated with any particular item to one or more merchants (e.g., a merchant provided in the merchant information and/or merchants in a marketplace associated with the system provider). In various embodiments, the item update request may include an item identifier, item details, a required quantity, a target merchant identifier, and/or a variety of other information about the item that updated information is being requested for. In some embodiments, the system provider device may send item update requests to the merchants automatically after the customer logs into a website or application (e.g., a digital wallet) provided by the system provider on the customer device 200. In some embodiments, the system provider device may send item update requests to the merchants after a customer requests to refresh the consolidated shopping cart (e.g., by selecting a refresh button in the digital wallet). In some embodiments, the system provider device may pull updated item information from the merchants periodically. In some embodiments, the merchant device may push updated item information to the system provider device without receiving a request from the system provider device.

Figure 4A:
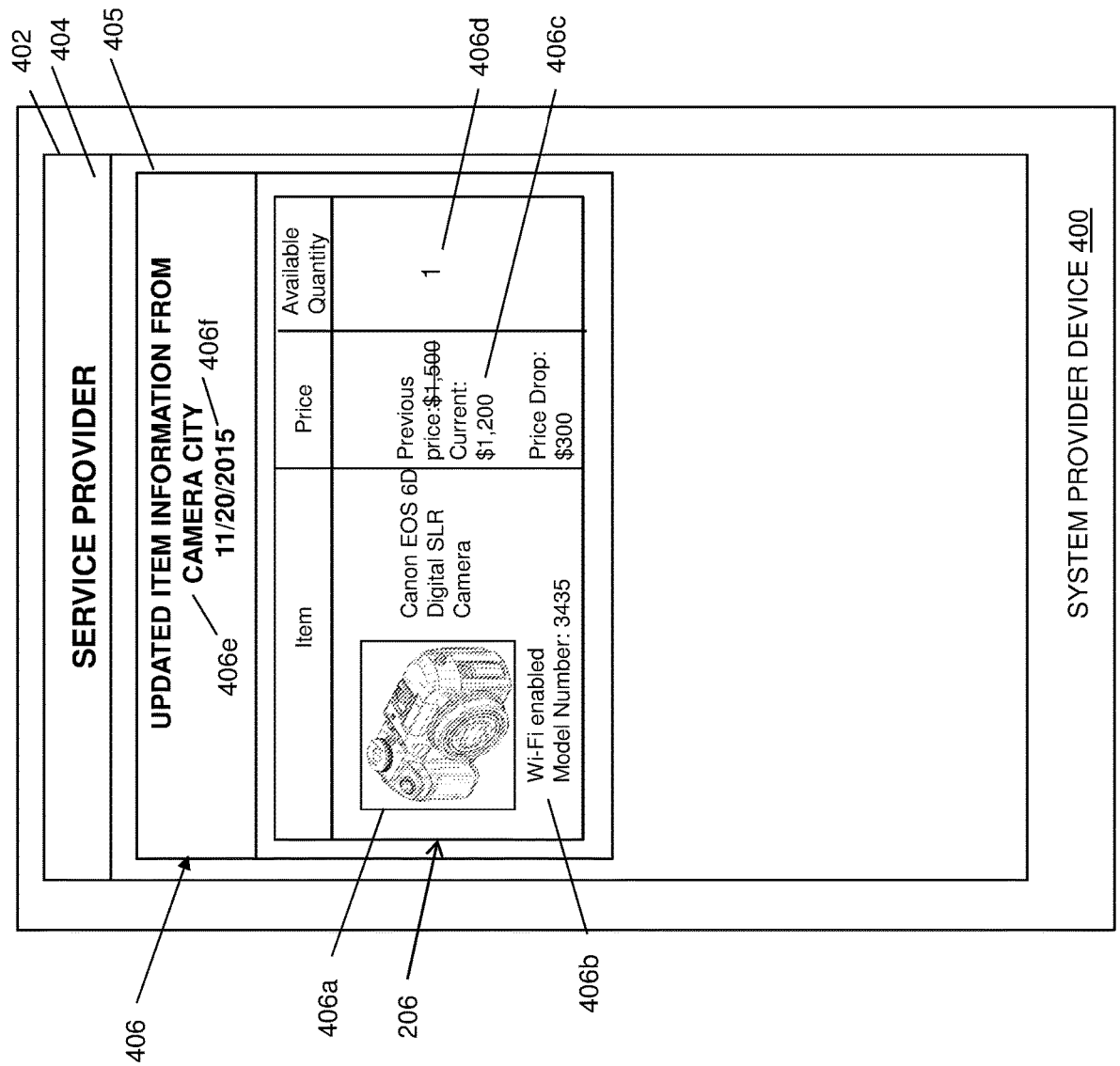
FIG. 4A is a schematic view illustrating an embodiment of a system provider device displaying updated item information.

As such, for any or all of the items 206, 218, and 266 in the consolidated shopping cart, the system provider device 400 may receive updated item information from one or more merchants. Referring to FIG. 4A, illustrated is an embodiment of a system provider device 400 that includes the display device 402 displaying an updated item information screen 404 including an updated item information section 405. The updated item information section 405 includes updated item information 406 associated with the item 206 received from a merchant (e.g., "Camera City"). The updated item information 406 may include an image 406*a*, item details 406*b*, price information 406*c* (e.g., "$1,200 with a $300 price drop), available quantity information 406*d* (e.g., "1"), merchant information 406*e* (e.g., "Camera City"), an updated time 406*f* (e.g., "11/20/2015"), and/or any other item information known in the art.

Figure 4B:
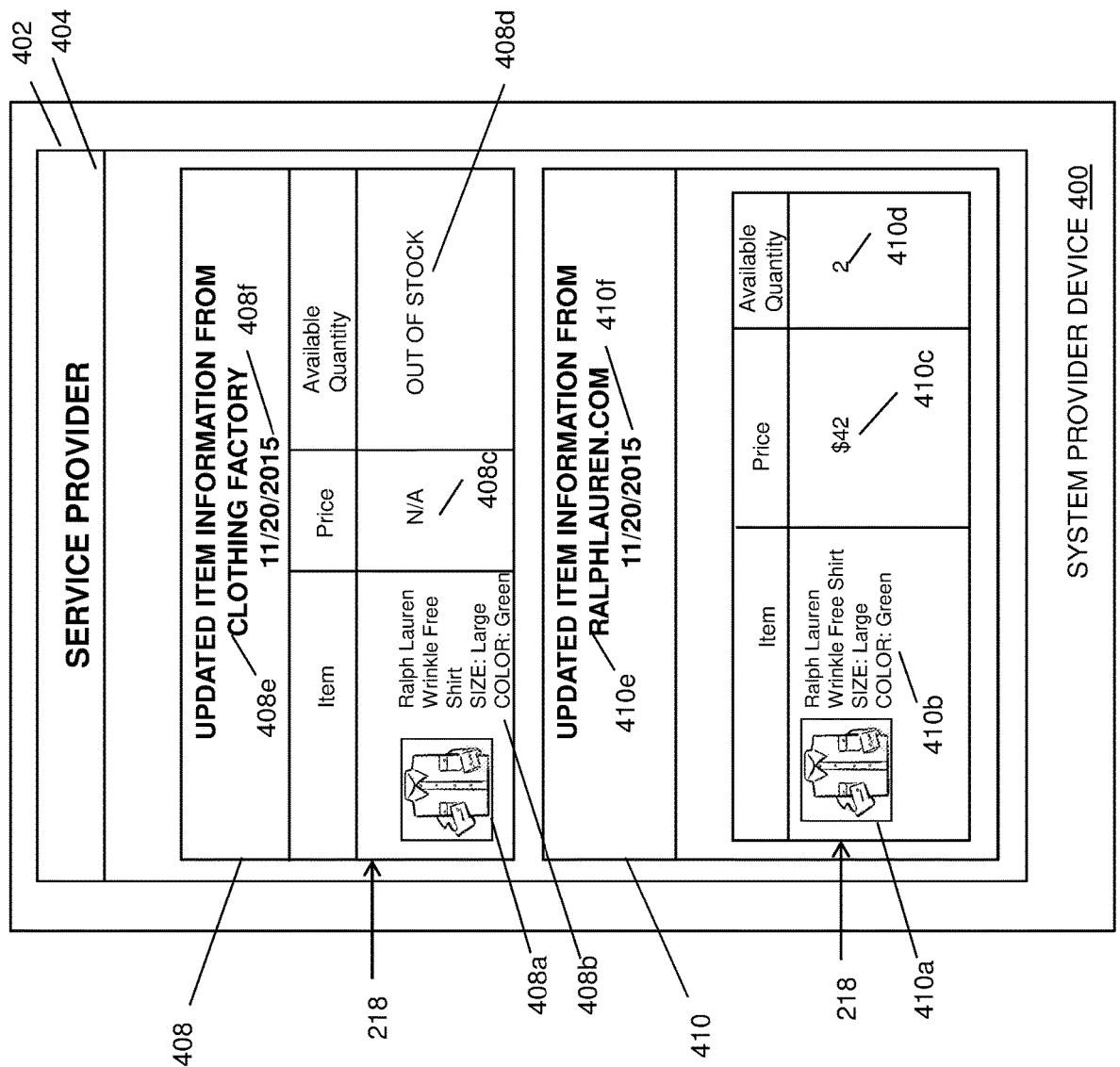
FIG. 4B is a schematic view illustrating an embodiment of a system provider device displaying updated item information.

In some embodiments, the system provider device 400 may determine that the particular item is not available at a particular merchant, and send an item update request to a different merchant. As illustrated in the example of FIG. 4B, the system provider device 400 may receive updated item information 408 associated with the item 218 from a merchant (e.g., "Clothing Factory"), and determine that the item 218 is no longer available at the merchant based on the price information 408*c* (e.g., "N/A") or quantity information 408*d* (e.g., "Out of Stock"). The system provider device 400 may then send item update requests to one or more other merchants in a marketplace associated with the system provider device 400, and receive updated item information 410 from another merchant (e.g., "Ralphlauren.com") in the marketplace (e.g., a merchant other than the merchant from whom the item was initially selected by the user). The updated item information 410 may include an item image 410*a*, item details 410*b*, price information 410*c* (e.g., "$42"), available quantity information 410*d* (e.g., "2"), merchant information 410*e* ("Ralphlauren.com"), and updated time 410*f* (e.g., "11/20/2015"). The system provider device 400 may then determine that the item 218 with the required quantity (e.g., "2" as provided in item information 222*d*) is available at the merchant "Ralphlauren.com."

Referring to the embodiment illustrated in FIG. 4C, after sending item update requests to one or more merchants in the marketplace, the system provider device 400 receives updated item information 420 associated with the item 266 from a merchant (e.g., "Wholesale Furniture"). The updated item information 420 may provide that the item 266 is available (e.g., having an available quantity 420*d* of "1") for purchase at a price 420*c* (e.g., $1,000).

Referring back to FIG. 1, the method 100 then proceeds to block 112, where offers for the items in the consolidated shopping cart are received. In some embodiments, a merchant may retrieve (e.g., from a merchant offer database) offers (e.g., credit offers, free shipping offers, discount offers, and/or other offer known in the art) associated with the items in an abandoned shopping cart (e.g., from a merchant abandoned shopping cart database), and send the offers to the system provider device. Alternatively, in some embodiments, the system provider device may assist the merchant in determining the offers to provide to the customer (e.g., using a conversion profile associated with the customer).

Figure 5:
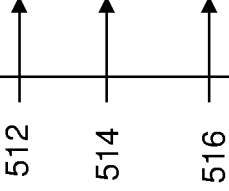
FIG. 5 is a schematic view illustrating an embodiment of a conversion database in a purchase abandonment conversion system.

Referring now to FIG. 5, an embodiment of a conversion database including a conversion profile table 502 associated with a customer is illustrated. In the illustrated example, the conversion profile table 502 may include columns that provide an offer configuration field 504, an overall conversion rate field 506, and category conversion rate fields for various categories (e.g., a conversion rate field 508 for the category "Electronics," a conversion rate field 510 for the category "Clothing," and a conversion rate field 512 for the category "Furniture") for any of a plurality of rows in the conversion profile table 502.

In some embodiments, for a particular customer, the offer with the highest conversion rate for items of different categories may be different. For example, in the particular embodiments illustrated in FIG. 5, for an electronics item, the conversion profile information 512 provides that a free shipping offer has the highest conversion rate (e.g., at 25%) comparing to other offers (e.g., a discount offer providing 10% off the entire purchase corresponding to a 5% conversion rate according to the conversion profile information 516). However, for a clothing item, the conversion profile information 514 provides that an offer providing a discount offer (e.g., 20% off the entire purchase) may have the highest conversion rate (e.g., at 20%) comparing to other offers (e.g., a free shipping offer corresponding to a 15% conversion rate).

In various embodiments, a system provider device 400 may send to an offer request associated with items in the consolidated shopping cart to one or more merchants. In some embodiments, the offer request is included in an item update request. The offer request may include an item category (e.g., "Electronics," "Clothing", "Furniture") of the particular item, conversion profile information (e.g., conversion profile information 512, 514, and/or 516), and/or a variety of other offer request information known in the art. In some embodiments, the offer request may include a recommended offer determined according to the conversion profile information. For example, the system provider device 400 may determine a recommended offer for a particular item by choosing an offer that has a higher conversion rate for the category of the particular item comparing to other offers. For example, an offer request associated with the item 206 may include a recommended offer for free shipping determined based on the conversion profile information 512, 514, and 516.

In some embodiments, after receiving the offer request from the system provider device 400, the merchant device may send an offer to the system provider device 400 (e.g., included in the updated item information or separately from the updated item information) determined based on the offer request. In some embodiments, the determined offer may be the same as the recommended offer in the offer request. Alternatively, the merchant device may determine that the recommended offer is not available for the particular item, and determine an offer using the conversion profile of the offer request. For example, the merchant device may receive an offer request associated with the item 266 include a recommended offer for free shipping, determine that the recommended offer is not available for the item 266, and choose an offer (e.g., "20% off the entire purchase") that has a highest conversion rate (e.g., 10%) comparing to offers other than the recommended offer according to the conversion profile information. As such, merchants may be informed of possible offers that may increase the probability of a sale for items, and may accept and provide those offers, or may determine and provide other offers for those items.

Figure 6:
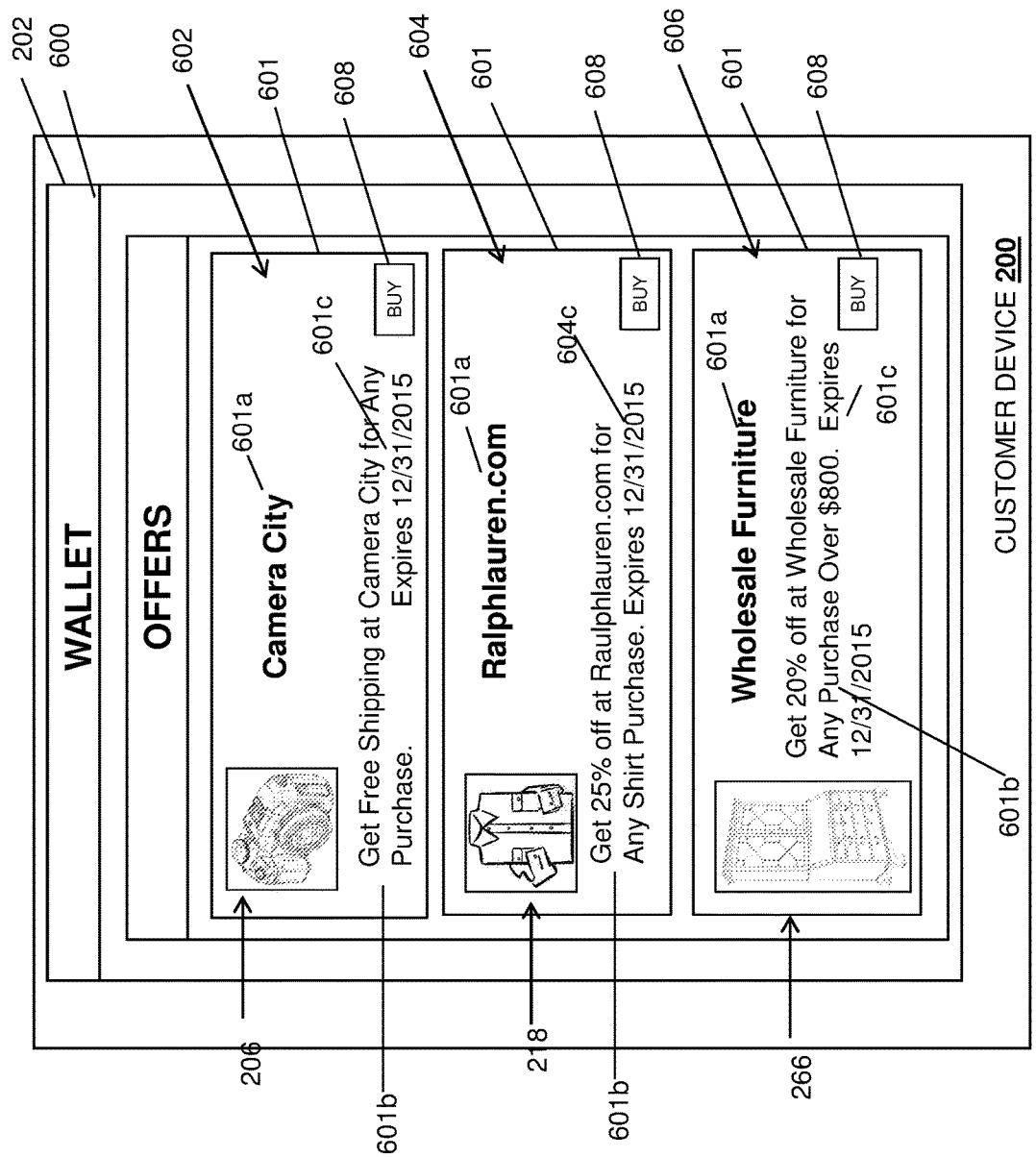
FIG. 6 is a screen shot illustrating an embodiment of a customer device displaying an offers screen.

Referring now to FIG. 6, an embodiment of a customer device 200 is illustrated that includes the display device 202 displaying an offers screen 600 for a plurality of offers that may be provided at block 112. In the illustrated embodiment, the offer screen 600 is provided by an application (e.g., a digital wallet) provided by the system provider device 400, and includes offer sections 601 displaying an offer 602 associated with the item 206, an offer 604 associated with the item 218, and an offer 606 associated with the item 266. Each of the offers section 601 may include a merchant identification 601a, an offer detail summary 601b, and an offer expiration date 601c. The offer section 601 may also include a buy button 608, which allows the customer to complete the purchase of the associated item.

In some embodiments, after selecting the buy button 608, the customer may be directed to the merchant's website to complete the purchase transaction. Alternatively, after selecting the buy button 608, the customer may complete the purchase transaction using the application (e.g., the digital wallet) provided by the system provider device 400 without visiting the merchant's website.

In some embodiments, the customer may complete the purchase transaction at a merchant different from the merchant at which the initial transaction (which resulted in the item being added to the subsequently abandoned shopping cart) was originated (e.g., the "origination merchant"). In an example, a customer may purchase the item 218 at a merchant (e.g., "Ralphlauren.com") which is different from the origination merchant (e.g., "Clothing Factory"). In another example, a customer may purchase the item 266 from a merchant (e.g., "Wholesale Furniture") which is different from the origination merchant (e.g., "$1^{st}$ Social Network"). Upon the completion of the purchase transaction, the origination merchant may receive a finder's fee for the completed purchase transaction (e.g., origination merchants may receive compensation (e.g., a set amount, a portion of the purchase amount, etc.) for items purchased from a different merchant as a result of abandoned shopping cart item information provided by that origination merchant).

In some embodiments, the received offers and the completed purchase transaction may be used by the system provider device 400 to generate a conversion profile for the customer. For example, customer offer data may be generated using the received offers, stored in one or more databases, and updated using the results of the received offers (e.g., redeemed by the customer in a completed purchase transaction, expired). For further example, a conversion profile including the conversion rate of a particular offer for a customer may be generated using the customer offer data.

Referring back to FIG. 1, the method 100 then proceeds to block 114, where financial information associated with the customer may be retrieved (e.g., from the customer device 200, the system provider device 400, or any other device). As discussed below, that financial information may be used to inform the customer that they have funds available to purchase previously selected items associated with one or more abandoned shopping carts.

Figure 7A:
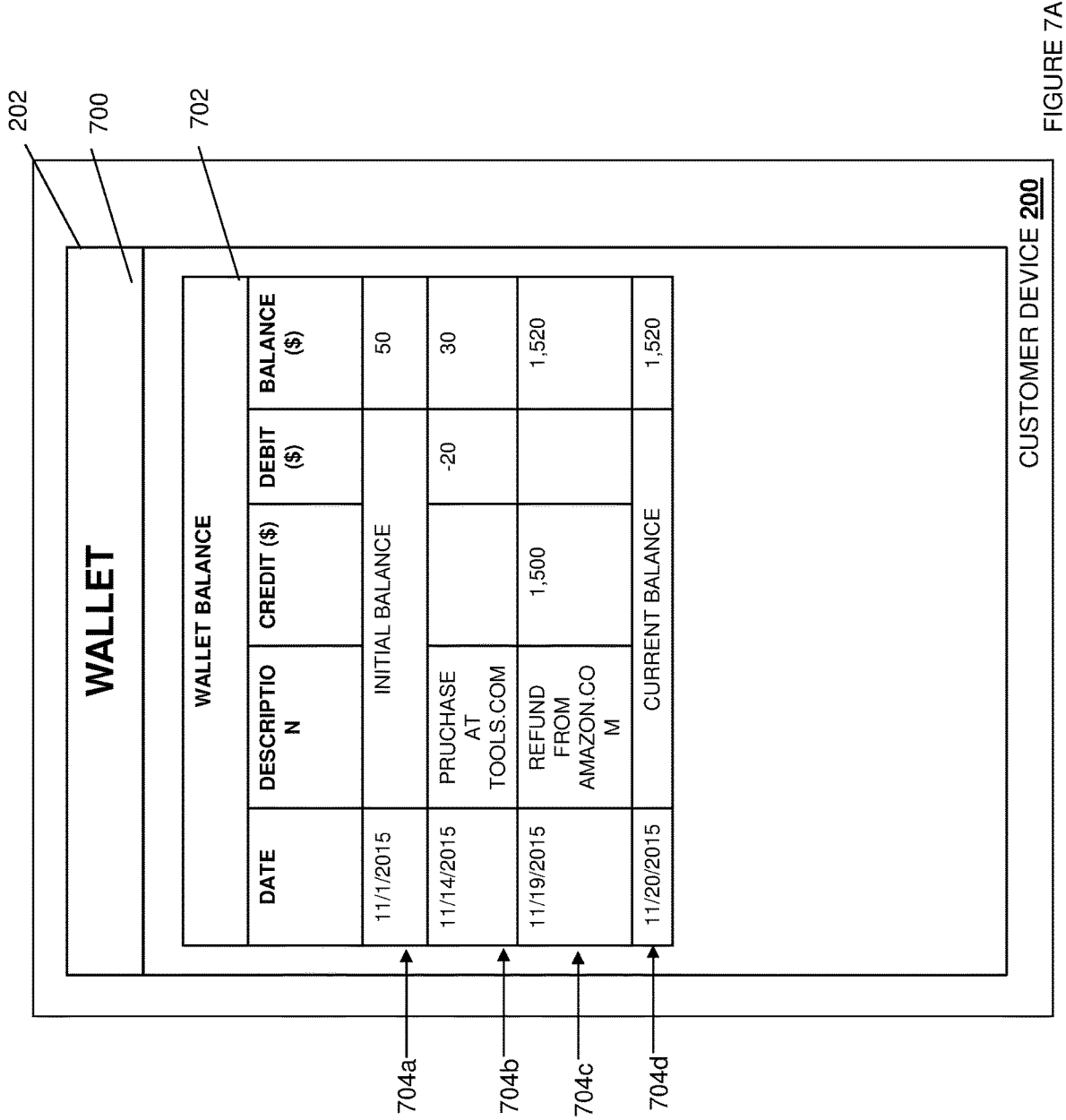
FIG. 7A is a screen shot illustrating an embodiment of a customer device displaying a wallet balance screen.

In some embodiments, the financial information may include wallet balance information associated with the customer. Referring to FIG. 7A, an embodiment of the customer device 200 is illustrated that includes the display device 202 displaying a wallet balance screen 700 including a wallet balance section 702. The wallet balance section 702 may include wallet balance information 704a, 704b, 704c, and 704d. For example, as illustrated in FIG. 7A, the wallet balance information 704a provides that the customer had an initial balance of $50 on Nov. 1, 2015. The wallet balance information 704b provides that on Nov. 14, 2015, a purchase at tools.com of the amount of $20 brings the wallet balance to $30. The wallet balance information 704c provides that on Nov. 19, 2015, a refund of $1,500 from Amazon.com brings the wallet balance to $1,520. The wallet balance information 704d provides that the current balance (on Nov. 20, 2015) is $1,520.

Figure 7B:
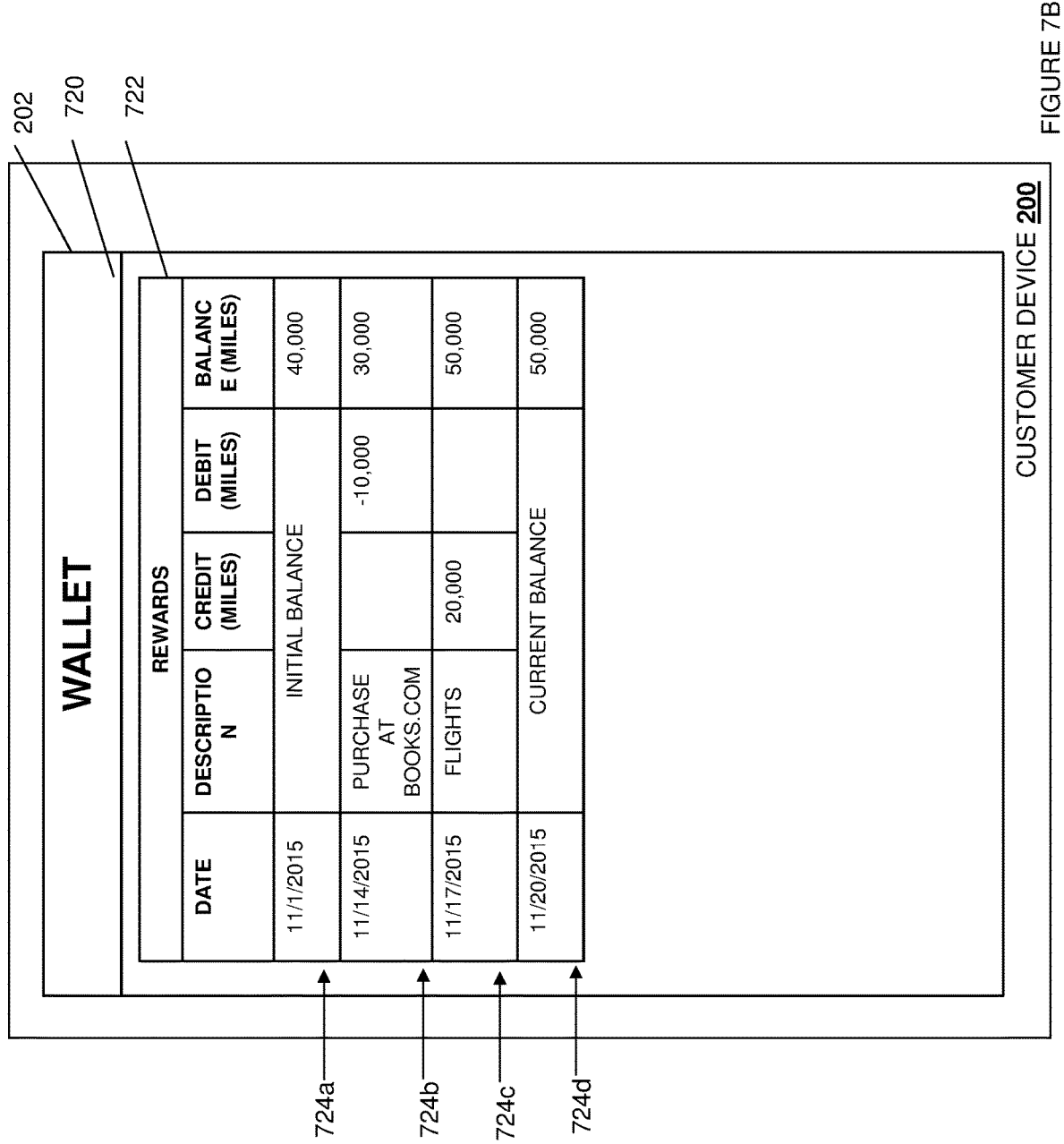
FIG. 7B is a screen shot illustrating an embodiment of a customer device displaying a rewards screen.

In some embodiments, the financial information may include rewards information (e.g., reward miles, loyalty points) associated with the customer. Referring to FIG. 7B, an embodiment of the customer device 200 is illustrated that includes the display device 202 displaying a wallet rewards screen 720 including a rewards section 722. The rewards section 722 may include reward information 724a, 724b, 724c, and 724d. For example, as illustrated in FIG. 7B, the reward information 724a provides that on Nov. 1, 2015, the customer has an initial reward balance of 40,000 miles. The reward information 724b provides that on Nov. 14, 2015, a purchase at books.com uses 10,000 miles and brings the reward balance to 30,000 miles. The reward information 724*c* provides that on Nov. 17, 2015, the customer earns 20,000 miles by flights, which brings the reward balance to 50,000 miles. The reward information 724*d* provides that the current reward balance (e.g., on Nov. 20, 2015) is 50,000 miles.

Figure 7C:
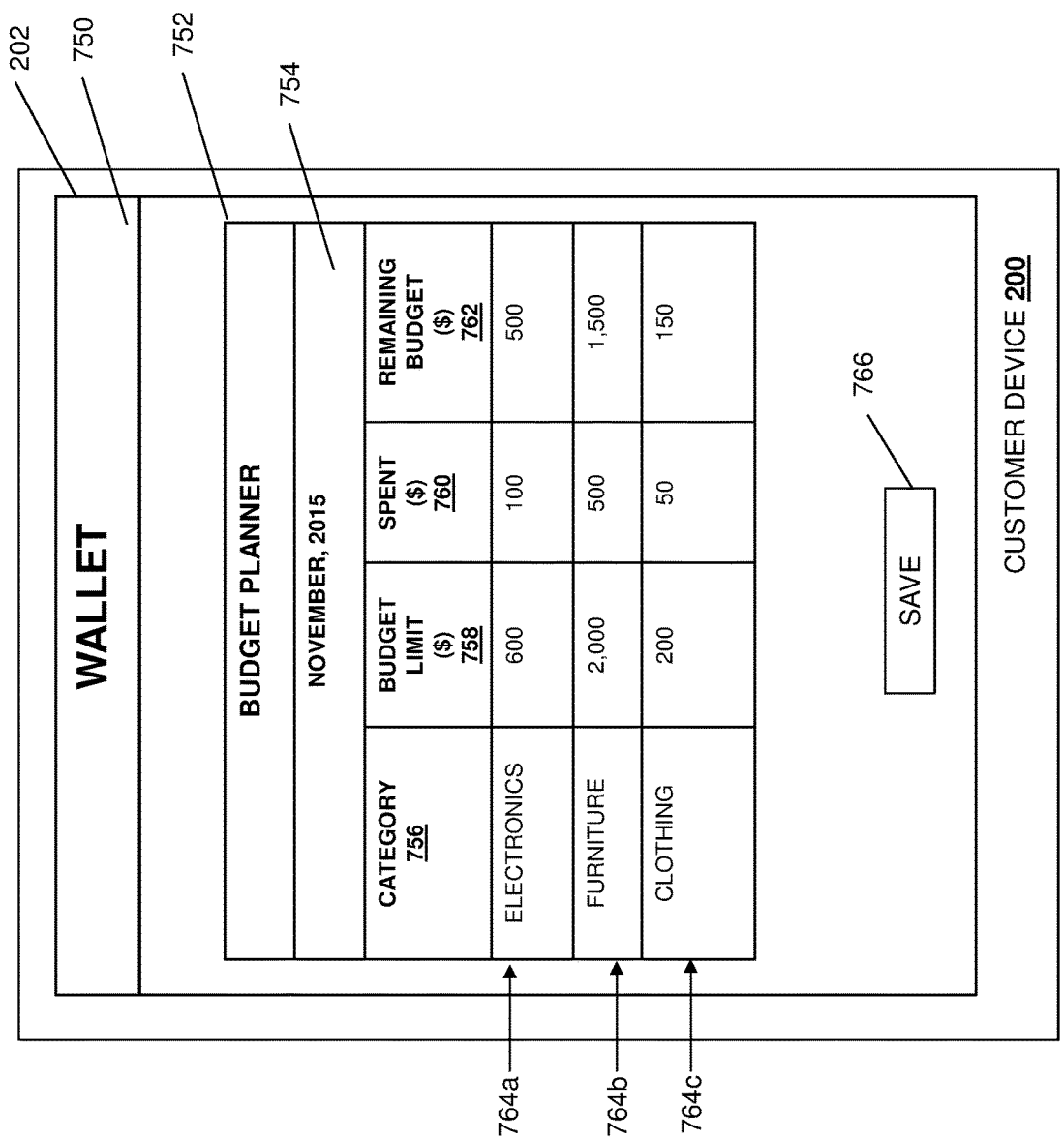
FIG. 7C is a screen shot illustrating an embodiment of a customer device displaying a budget planner screen.

In some embodiments, the financial information may include budget information associated with the customer. Referring to FIG. 7C, an embodiment of the customer device 200 is illustrated that includes the display device 202 displaying a budget planner screen 750 including a budget planner section 752. The budget planner section 752 may include a budget period 754 (e.g., November 2015). The budget planner section 752 may further include budget information 764*a*, 764*b*, and 764*c* associated with the budget period 754. Each budget information 764*a*, 764*b*, and 764*c* may include a budget category 756, a budget limit 758, a spent budget 760, a remaining budget 762, and/or other budget information known in the art. For example, the budget information 764*a* provides that for the budget category "Electronics," the customer has spent $100 out of a $600 budget limit, and has a remaining budget of $500. For further example, the budget information 764*b* provides that for the budget category "FURNITURE," the customer has spent $500 out of a $2,000 budget limit, and has a remaining budget of $1,500. For further example, the budget information 764*c* provides that for a budget category "CLOTHING," the customer has spent $50 out of a $200 budget limit, and has a remaining budget of $150. In some embodiments, the system provider device 400 may update the budget information (e.g., the spent budget 760, the remaining budget 762) using the purchase transactions completed by the customer during the budget time period 752.

In some embodiments, each of the budget limit information 758 of the budget information 764*a*, 764*b*, and 764*c* may be editable by the customer. In response to the customer editing the budget limit 758, the remaining budget 762 may be adjusted by the system provider device (e.g., by deducting the spent budget 760 from the budget limit 758). In some embodiments, the customer may select the save button 766 if the customer would like to save the changes that the customer has made to the budget limit information 758 of the budget information 764*a*, 764*b*, and 764*c*. While a few examples of financial information (e.g., wallet balances, rewards information, and budget information) have been discussed that may be used to inform a user that they have the ability to purchase items previously selected and abandoned, other financial information about a user may be collected and utilized in a similar manner while remaining within the scope of the present disclosure.

Referring back to FIG. 1, the method 100 then proceeds to block 116, where the consolidated shopping cart is updated using the updated item information, received offers, and/or financial information, and then provided to the customer.

Figure 8A:
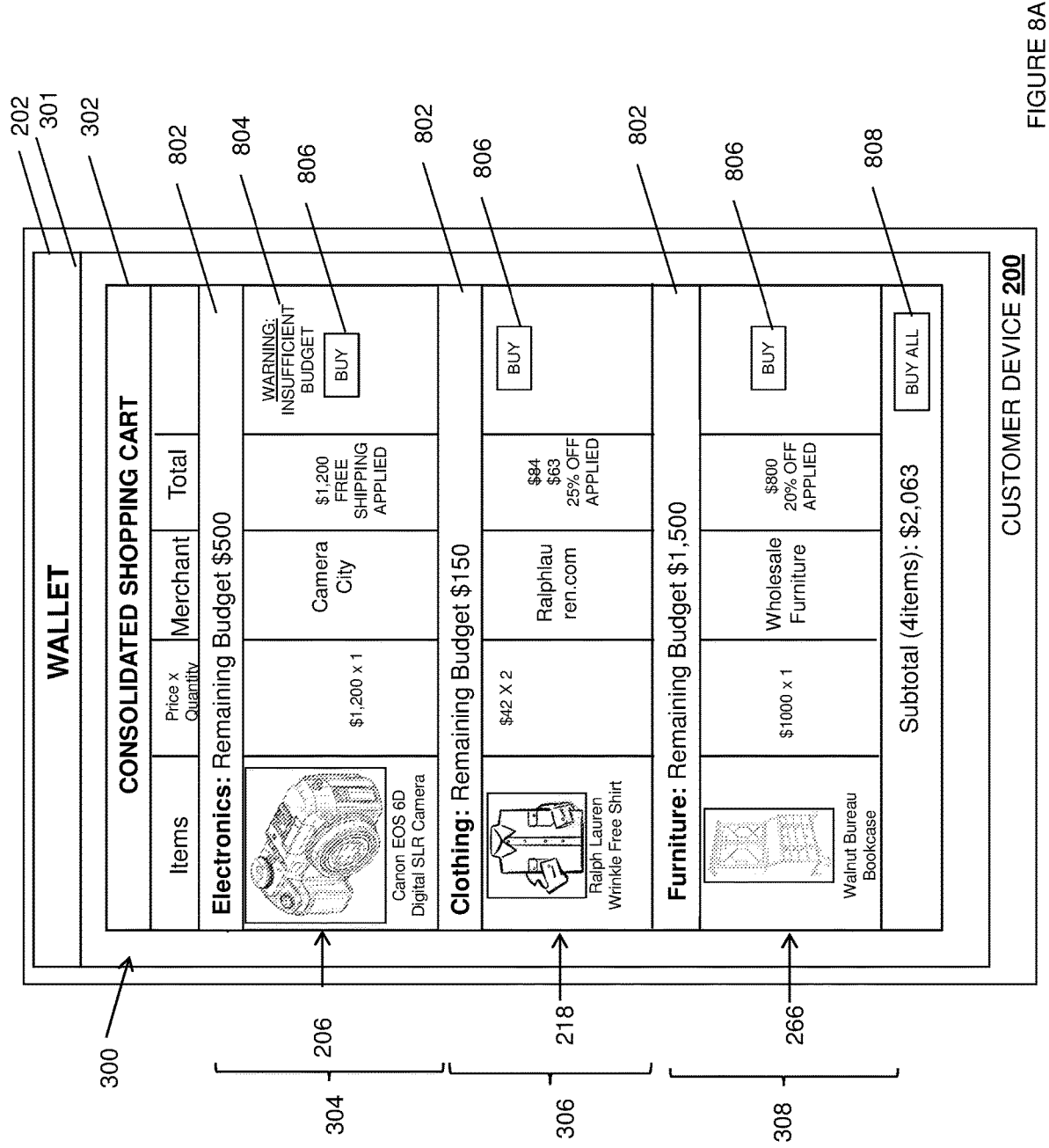
FIG. 8A is a screen shot illustrating an embodiment of a customer device displaying a consolidated shopping cart screen.

Referring now to FIG. 8A, in some embodiments, the updated consolidated shopping cart 300 is provided to the customer device 200 using a website or application provided by the system provider device 400. Illustrated in FIG. 8A is an embodiment of the customer device 200 that includes the display device 202 displaying a consolidated shopping cart screen 301 including a consolidated shopping cart section 302. The consolidated shopping cart section 302 may display the consolidated shopping cart 300 updated using the updated item information, offers, and the financial information.

In some embodiments, the consolidated shopping cart 300 is updated using the updated item information (e.g., the updated item information 406, 408, 410, and 420). In the illustrated embodiment, the price of the item 206 is updated using the price information 406*c* (e.g., $1,200) of the updated item information 406. In another example, the price and the merchant of the item 218 is updated using the price information 410*c* and the merchant information 410*e* (e.g., "Ralphlauren.com") of the updated item information 410. In another example, the price and the merchant of the item 266 is updated using the price information 420*c* (e.g., $1,000) and the merchant information 420*e* (e.g., "Wholesale Furniture") of the updated item information 420.

In some embodiments, the consolidated shopping cart is updated using the offers (e.g., the offers 602, 604, and 606). In the illustrated embodiment, the total cost of the item 206 is updated using the offer 602 (e.g., a total cost of $1,200 after applying the free shipping offer). In another example, the total cost of the item 218 is updated using the offer 604 (e.g., a total cost of $63 after applying a discount offer of 25% off).

In some embodiments, the consolidated shopping cart section 302 may be updated using the financial information (e.g., the budget information 764*a*, 764*b*, and 764*c*). For example, in the illustrated embodiment of FIG. 8A, the category sections may include remaining budget areas 804, which may display the remaining budget 762 of the budget information 764*a*, 764*b*, and 764*c* for the respective categories 756 (e.g., $500 for the electronics category 304, $150 for the clothing category 306, and $1,500 for the furniture category 308). In some embodiments, the system provider device 400 may determine that the remaining budget for a particular category may not be sufficient for purchasing an item, and in response, provide a notification to the customer. In the illustrated embodiment, the system provider device 400 may determine that the item 206 (with an updated total cost of $1,200) exceeds the remaining budget 762 (e.g., $500) for the category (e.g., the electronics category 304) associated with the item 206. In response, the system provider device 400 may generate an insufficient budget notification 804 displayed next to the item 206.

In some embodiments, the consolidated shopping cart section 302 may include buy buttons 806 allowing the customer to complete the purchase of each of items 206, 218, and 266, and a buy all button 808 allowing the customer to complete the purchase of all items in the consolidated shopping cart 300.

In some embodiments, the system provider device 400 may automatically sort the items in the consolidated shopping cart 300 (e.g., according to the available remaining budget and/or offers associated with each item). The consolidated shopping cart section 302 may display the items in the sorted order, which may help the customer to make faster purchase decisions. In an example, the item 218 may be displayed at the top of the consolidated shopping cart section 302 where a discount offer is received for the item 218. In another example, the item 206 may be displayed at the bottom of the consolidated shopping cart section 302 where there is no sufficient budget for purchasing the item 206.

Referring now to FIG. 8B, in some embodiments, the updated consolidated shopping cart 300 may be provided to the customer through a social network provided by a social network service provider. Illustrated in FIG. 8B is an embodiment of a customer device 200 includes the display device 202 displaying a social network screen 850 including a social network section 852 and a consolidated shopping cart section 854. In some embodiments, the system provider device 400 may send the updated consolidated shopping cart 300 to a social network provider device. The social network provider device may then provide the updated consolidated shopping cart 300 on a customer device 200 through the social network (e.g., as a "Pin" on Pinterest, an application provided by Pinterest, Inc. of San Francisco, Calif.).

As illustrated in the example of FIG. 8B, in some embodiments, only selected items from the consolidated shopping cart 300 are displayed to the customer through a social network (e.g., "1$^{st}$ social network" and/or "2$^{nd}$ social network"). For example, the system provider device 400 may choose items that have sufficient remaining budget (e.g., items 218 and 226) to be sent to the social network provider device and displayed in the consolidated shopping cart section 854, while items without sufficient remaining budget (e.g., the item 206) may not be not displayed in the consolidated shopping cart section 854. The consolidated shopping cart section 854 may also include buy buttons 856, which allows the customer to complete the purchase of the associated item.

The examples illustrated in FIGS. 8A and 8B are not intended to be limiting, and the consolidated shopping cart 300 may be provided to the customer device in a variety of manners (through a website, an application, a TV, newsfeed, as a message (e.g., an email, a text message, a picture message, a "pop-up", a voice call, etc.) without departing from the scope of the present disclosure. In some embodiments, the consolidated shopping cart 300 may be provided to other service providers (e.g., rewards providers, discount providers, and marketplace providers) that the system provider has a partnership with without departing from the scope of the present disclosure.

Referring back to FIG. 1, the method 100 then proceeds to block 118, where one or more purchase recommendations may be determined using the financial information associated with the customer and then provided to the customer device.

Referring now to FIG. 9A, in some embodiments, the purchase recommendation may be determined using the wallet balance information and the budget information. Illustrated in FIG. 9A is an embodiment of a customer device 200 including the display device 202 displaying a purchase recommendation screen 900 including purchase recommendation section 902. In the particular embodiment, the purchase recommendation section 902 includes purchase recommendations 904a and 904b. The purchase recommendation section 902 may include a recommended funding resource 906 (e.g., the wallet balance), a recommended item (e.g., the item 206, the item 218), the offers 908 (e.g., free shipping, 20% off), and/or any other incentives known in the art for the customer to complete the recommended purchase. The purchase recommendation section 902 may also include buy buttons 910, and the customer may choose the buy button 910 to complete the recommended purchase.

In some embodiments, the system provider device 400 may detect a change in the wallet balance and/or the budget information (e.g., an increase in the wallet balance caused by a refund from Amazon.com as provided in the wallet balance information 704c, an increase in the budget limit 758 provided by the customer), and determine items to recommend for purchase based on the wallet balance and the budget information. For example, the system provider device 400 may determine that the customer has a wallet balance of $1520, and determine to recommend the item 266 for purchase after determining that the wallet balance is greater than the total cost for the item 266 (e.g., $800), and that the remaining budget (e.g., $1,500) for the corresponding category (e.g., "Furniture") exceeds the total cost for the item 266 (e.g., $800). On the other hand, the system provider device 400 may determine not to recommend the item 206 for purchase because the remaining budget (e.g., $500) for the associated category (e.g., "Electronics") is less than the total cost (e.g., $1,200) for the item 206.

Figure 9B:
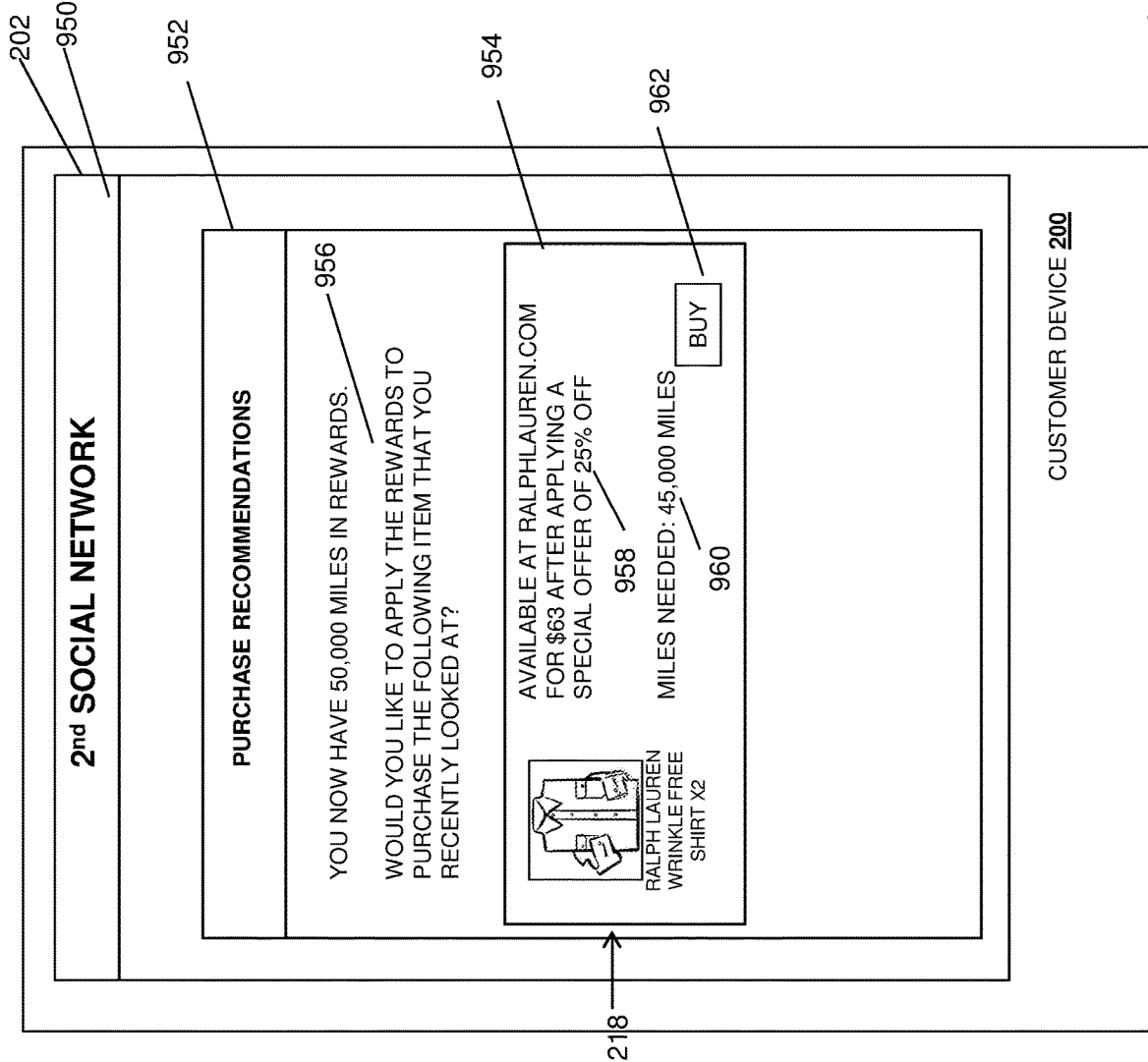
FIG. 9B is a screen shot illustrating an embodiment of a customer device displaying a purchase recommendation screen through a social network.

Referring to FIG. 9B, in some embodiments, a purchase recommendation may be determined using the reward balance information. Illustrated in FIG. 9B is an embodiment of a customer device 200 including the display device 202 displaying a purchase recommendation screen 950 including purchase recommendation section 952 through a social network (e.g., "1$^{st}$ social network" and/or "2$^{nd}$ social network"). In the particular embodiment, the purchase recommendation section 902 includes purchase recommendation 954. The purchase recommendation section 902 may include a recommended funding resource 956 (e.g., rewards), a recommended item (e.g., the item 218), an offer 958 (e.g., 25% off), the total cost in rewards (e.g., 45,000 miles), and/or any other incentives known in the art for the customer to complete the recommended purchase. The purchase recommendation section 950 may also include a buy button 962, and the customer may choose the buy button 962 to complete the recommended purchase.

In some embodiments, the system provider device 400 may detect an increase in the reward balance (e.g., a credit of 20,000 miles provided by the reward information 724c) and determine a purchase recommendation based on the reward balance. For example, the system provider device may determine that the customer currently has a reward balance of 50,000 miles, identify a merchant where a customer may redeem rewards for the items in the consolidated shopping cart (e.g., "Ralphlauren.com"), and retrieve the miles required for making the purchase (e.g., 45,000 miles for purchasing the item 220) from the merchant. In the illustrated embodiment, the system provider device determines that the current reward balance (e.g., 50,000 miles) is greater than the reward required to purchase the item 220, and provide the purchase recommendation 954 to the customer.

The examples illustrated in FIGS. 9A and 9B are not intended to be limiting, and the purchase recommendations may be provided to the customer device in a variety of manners (through a website, an application, as a message (e.g., an email, a text message, a picture message, a "pop-up", a voice call, etc.) without departing from the scope of the present disclosure. In some embodiments, the system provider device may detect a change in updated item information (e.g., a price drop of a particular item) and/or various offers received from the merchants including offers targeted at the particular customer (e.g., determined using the conversion profile) and other offers known in the art (e.g., seasonal offers, clearance sales). In some embodiments, the purchase recommendations may be provided to other service providers (e.g., rewards providers, discount providers, and marketplace providers).

Thus, systems and methods have been described that operate to provide a consolidated shopping cart including items in abandoned shopping carts and other items of interest from a variety of sources (e.g., merchants, social network service providers, rewards servers) so that the customer gains the convenience of locating an item of interest in a single consolidated shopping cart and of completing a purchase transaction at another more convenient time. The systems and methods may update the consolidated shopping cart using a variety of information. For example, the systems may request and receive updated item information including inventory and price from merchants associated with the original abandoned shopping carts, or from other merchants within a marketplace. The systems may then generate a conversion profile for a particular customer, and assist the merchants to provide offers targeted at that customer using the conversion profile. The systems may also retrieve financial information associated with the customer, and update the consolidated shopping cart using the financial information. Furthermore, the systems and methods may provide purchase recommendations for selected items in the consolidated shopping cart determined based on the financial information (e.g., account balance, reward balance, budget information) of the customer. Such systems and methods may help convert items in abandoned shopping carts to completed purchase transactions, thus providing convenience for customers and increasing revenues for merchants.

Referring now to FIG. 10, an embodiment of a network-based system 1000 for implementing one or more processes described herein is illustrated. As shown, network-based system 1000 may comprise or implement a plurality of servers and/or software components that operate to perform various methodologies in accordance with the described embodiments. Exemplary servers may include, for example, stand-alone and enterprise-class servers operating a server OS such as a MICROSOFT® OS, a UNIX® OS, a LINUX® OS, or other suitable server-based OS. It can be appreciated that the servers illustrated in FIG. 10 may be deployed in other ways and that the operations performed and/or the services provided by such servers may be combined or separated for a given implementation and may be performed by a greater number or fewer number of servers. One or more servers may be operated and/or maintained by the same or different entities.

The embodiment of the networked system 1000 illustrated in FIG. 10 includes a plurality of customer devices 1002, a plurality of merchant devices 1004, a system provider device 1006, and a plurality of social network service provider devices 1008 in communication over a network 1010. Any of the customer devices 1002 may be the customer devices 200 discussed above and used by the customer discussed above. Any of the merchant devices 1004 may be the merchant device discussed above. The system provider device 1006 may be the system provider device 400 discussed above and may be operated by a system provider such as, for example, PayPal Inc. of San Jose, Calif.

The customer devices 1002, merchant devices 1004, system provider device 1006, social network service provider devices 1008 may each include one or more processors, memories, and other appropriate components for executing instructions such as program code and/or data stored on one or more computer readable mediums to implement the various applications, data, and steps described herein. For example, such instructions may be stored in one or more computer readable mediums such as memories or data storage devices internal and/or external to various components of the system 1000, and/or accessible over the network 1010.

The network 1010 may be implemented as a single network or a combination of multiple networks. For example, in various embodiments, the network 1010 may include the Internet and/or one or more intranets, landline networks, wireless networks, and/or other appropriate types of networks.

The customer device 1002 may be implemented using any appropriate combination of hardware and/or software configured for wired and/or wireless communication over network 1010. For example, in one embodiment, the customer device 1002 may be implemented as a personal computer of a user in communication with the Internet. In some embodiments, the customer device 1002 may be a wearable device. In some embodiments, the customer device 1002 may be a smart phone, personal digital assistant (PDA), laptop computer, and/or other types of computing devices.

The customer device 1002 may include one or more browser applications which may be used, for example, to provide a convenient interface to permit the customer to browse information available over the network 1010. For example, in one embodiment, the browser application may be implemented as a web browser configured to view information available over the Internet.

The customer device 1002 may also include one or more toolbar applications which may be used, for example, to provide user-side processing for performing desired tasks in response to operations selected by the customer. In one embodiment, the toolbar application may display a user interface in connection with the browser application.

The customer device 1002 may further include other applications as may be desired in particular embodiments to provide desired features to the customer device 1002. In particular, the other applications may include a social network application provided by a social network service provider through the social network service provider device 1008. The other applications may also include security applications for implementing user-side security features, programmatic user applications for interfacing with appropriate application programming interfaces (APIs) over the network 1010, or other types of applications. Email and/or text applications may also be included, which allow the customer to send and receive emails and/or text messages through the network 1010. The customer device 1002 includes one or more user and/or device identifiers which may be implemented, for example, as operating system registry entries, cookies associated with the browser application, identifiers associated with hardware of the customer device 1002, or other appropriate identifiers, such as a phone number. In one embodiment, the customer identifier may be used by the system provider device 1006 and/or social network service provider device 1008 to associate the customer with a particular account as further described herein.

The merchant devices 1004 may be maintained, for example, by a conventional or on-line merchant, conventional or digital goods seller, individual seller, and/or application developer offering various products and/or services in exchange for payment to be received conventionally or over the network 1010. In this regard, the merchant devices 1004 may include a database identifying available products and/or services (e.g., collectively referred to as items) which may be made available for viewing and purchase by the customers.

The merchant devices 1004 also include a checkout application which may be configured to facilitate the purchase by the customers. The checkout application may be configured to accept payment information from the customer through the customer devices 1002, from the system provider through the system provider device 1006, and/or other system providers over the network 1010.

Figure 11:
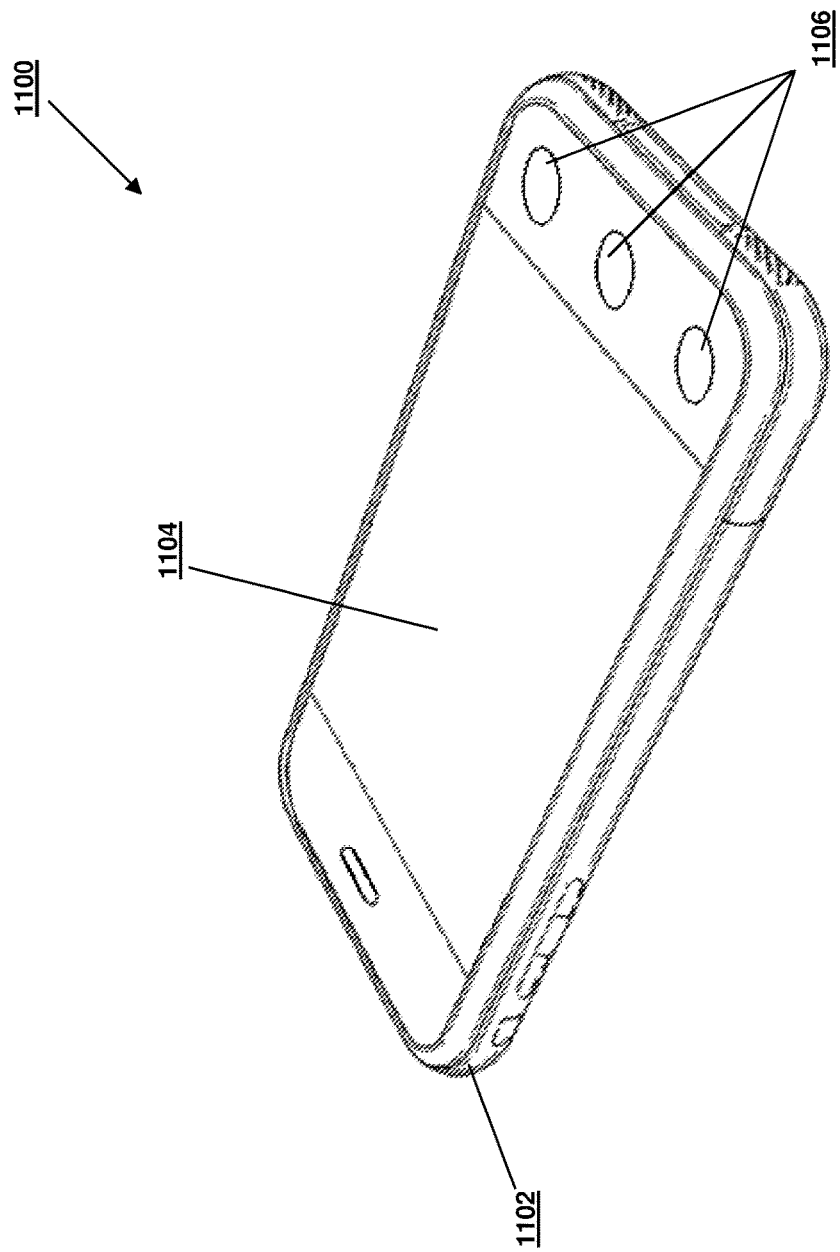
FIG. 11 is a perspective view illustrating an embodiment of a customer device.

Referring now to FIG. 11, an embodiment of a customer device 1100 is illustrated. The customer device 1100 may be the customer devices 200. The customer device 1100 includes a chassis 1102 having a display 1104 and an input device including the display 1104 and a plurality of input buttons 1106. One of skill in the art will recognize that the customer device 1100 is a portable or mobile phone including a touch screen input device and a plurality of input buttons that allow the functionality discussed above with reference to the method 100. However, a variety of other portable/mobile customer devices may be used in the method 100 without departing from the scope of the present disclosure.

Figure 12:
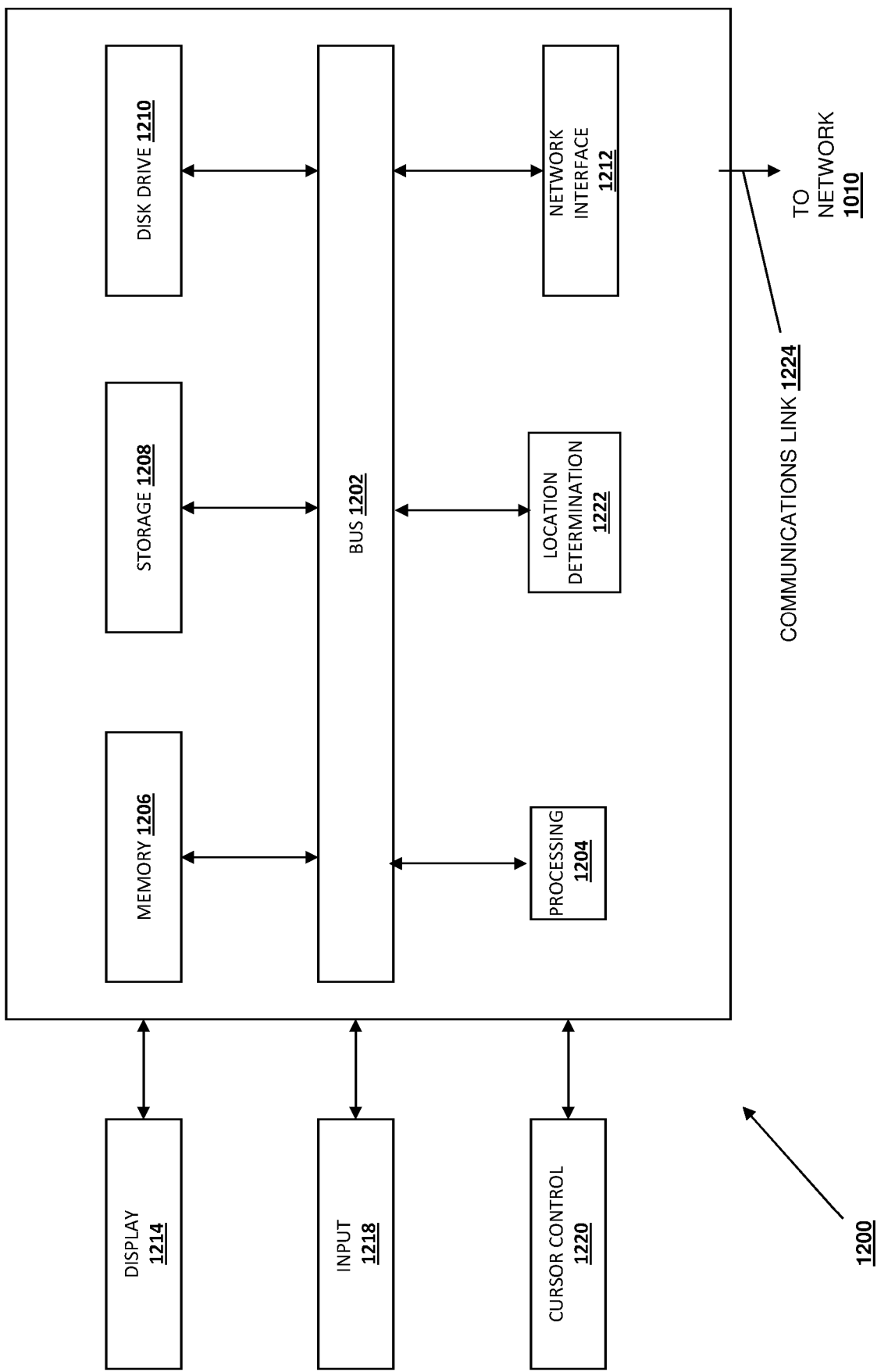
FIG. 12 is a schematic view illustrating an embodiment of a computer system.

Referring now to FIG. 12, an embodiment of a computer system 1200 suitable for implementing, for example, the customer devices 200, merchant devices 1004, social network service provider devices 1008, and/or system provider device 400, is illustrated. It should be appreciated that other devices utilized by users, persons, and/or system providers in the system discussed above may be implemented as the computer system 1200 in a manner as follows.

In accordance with various embodiments of the present disclosure, computer system 1200, such as a computer and/or a network server, includes a bus 1202 or other communication mechanism for communicating information, which interconnects subsystems and components, such as a processing component 1204 (e.g., processor, micro-controller, digital signal processor (DSP), etc.), a system memory component 1206 (e.g., RAM), a static storage component 1208 (e.g., ROM), a disk drive component 1210 (e.g., magnetic or optical), a network interface component 1212 (e.g., modem or Ethernet card), a display component 1214 (e.g., CRT or LCD), an input component 1218 (e.g., keyboard, keypad, or virtual keyboard), a cursor control component 1220 (e.g., mouse, pointer, or trackball), and a location sensor component 1222 (e.g., a Global Positioning System (GPS) device as illustrated, a cell tower triangulation device, and/or a variety of other location determination devices known in the art). In one implementation, the disk drive component 1210 may comprise a database having one or more disk drive components.

In accordance with embodiments of the present disclosure, the computer system 1200 performs specific operations by the processor 1204 executing one or more sequences of instructions contained in the memory component 1206, such as described herein with respect to the customer device(s) 200, the merchant devices 1004, the social network service provider devices 1008, and/or the system provider device(s) 400. Such instructions may be read into the system memory component 1206 from another computer readable medium, such as the static storage component 1208 or the disk drive component 1210. In other embodiments, hard-wired circuitry may be used in place of or in combination with software instructions to implement the present disclosure.

Logic may be encoded in a computer readable medium, which may refer to any medium that participates in providing instructions to the processor 1204 for execution. Such a medium may take many forms, including but not limited to, non-volatile media, volatile media, and transmission media. In one embodiment, the computer readable medium is non-transitory. In various implementations, non-volatile media includes optical or magnetic disks, such as the disk drive component 1210, volatile media includes dynamic memory, such as the system memory component 1206, and transmission media includes coaxial cables, copper wire, and fiber optics, including wires that comprise the bus 1202. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read. In one embodiment, the computer readable media is non-transitory.

In various embodiments of the present disclosure, execution of instruction sequences to practice the present disclosure may be performed by the computer system 1200. In various other embodiments of the present disclosure, a plurality of the computer systems 1200 coupled by a communication link 1224 to the network 1010 (e.g., such as a LAN, WLAN, PTSN, and/or various other wired or wireless networks, including telecommunications, mobile, and cellular phone networks) may perform instruction sequences to practice the present disclosure in coordination with one another.

The computer system 1200 may transmit and receive messages, data, information and instructions, including one or more programs (i.e., application code) through the communication link 1224 and the network interface component 1212. The network interface component 1212 may include an antenna, either separate or integrated, to enable transmission and reception via the communication link 1224. Received program code may be executed by processor 1204 as received and/or stored in disk drive component 1210 or some other non-volatile storage component for execution.

Figure 13:
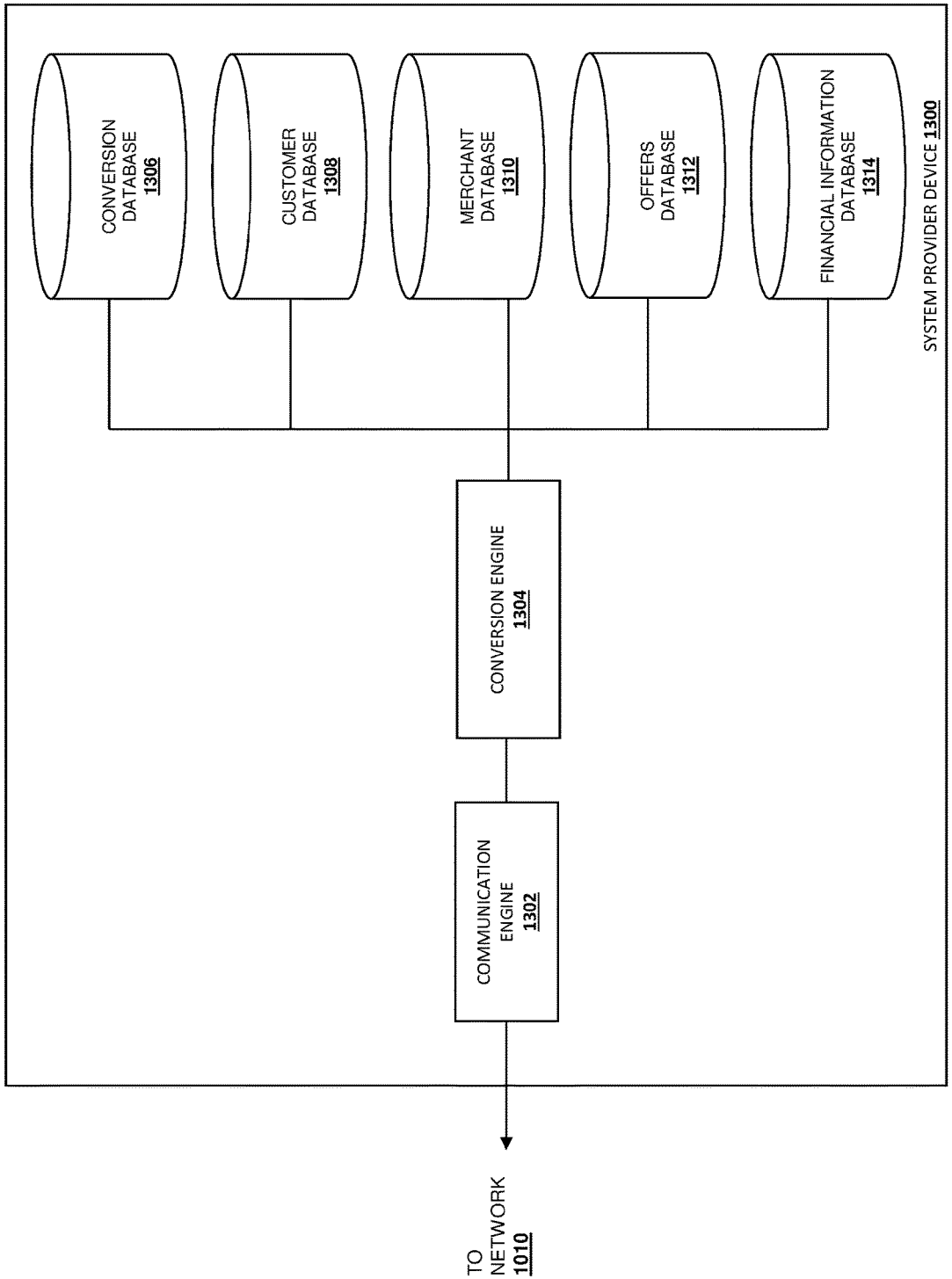
FIG. 13 is a schematic view illustrating an embodiment of a system provider device.

Referring now to FIG. 13, an embodiment of a system provider device 1300 is illustrated. In an embodiment, the system provider device 1300 may be the system provider devices 400 discussed above. The system provider device 1300 includes a communication engine 1302 that is coupled to the network 1010 and to a conversion engine 1304 that is coupled to a conversation database 1306, a customer database 1308, a merchant database 1310, an offers database 1312, and a financial information database 1314. The communication engine 1302 may be software or instructions stored on a computer-readable medium that allows the system provider device 1300 to send and receive information over the network 1010. The conversion engine 1304 may be software or instructions stored on a computer-readable medium that is operable to generate a consolidated shopping cart using received item information associated with items of interest, store customer offer data in the databases, generate customer conversion profiles using the customer offer data and store the customer conversion profiles in the databases, retrieve financial information from the databases and determine purchase recommendations using the financial information, provide the notification to the customer, and provide any of the other functionality that is discussed above. While the databases 1306-1314 have been illustrated as separate from each other and located in the system provider device 1300, one of skill in the art will recognize that any or all of the databases 1306-1314 may be combined and/or may be connected to the conversion engine 1304 through the network 1010 without departing from the scope of the present disclosure.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the scope of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A purchase recommendation system, comprising:
    a non-transitory memory storing instructions; and
    one or more hardware processors coupled to the non-transitory memory and configured to execute the instructions to cause the purchase recommendation system to perform operations comprising:
        monitoring, at intervals, a heartbeat cookie of a customer device associated with a customer;
        detecting that the heartbeat cookie cannot be replaced at a certain interval, wherein the detecting that the heartbeat cookie cannot be replaced indicates that the customer device has abandoned a shopping cart, and wherein the shopping cart comprises a shopping list including a plurality of items associated with the customer;
        accessing financial information comprising a conversion profile having first conversion data associated with an acceptance of a first benefit by the customer and second conversion data associated with an acceptance of a second benefit by the customer;
        determining a selected item from the shopping list;
        comparing the first conversion data with the second conversion data, wherein the first conversion data and the second conversion data are associated with the selected item;
        selecting a preferred benefit based on the comparing, wherein the preferred benefit is the first benefit if the first conversion data is greater than the second conversion data, or the preferred benefit is the second benefit if the second conversion data is greater than the first conversion data;
        generating a purchase recommendation comprising the selected item and the preferred benefit;
        determining a purchase amount associated with the selected item and the preferred benefit;
        comparing the purchase amount to a budget of the financial information to determine if the purchase amount exceeds the budget of the financial information;
        in response to a determination that the purchase amount exceeds the budget of the financial information, monitoring the budget to detect a change in the budget from a refund credit applied to the budget, wherein the change in the budget from the refund credit applied to the budget increases the budget to an amount that exceeds the purchase amount associated with the selected item and the preferred benefit; and
        in response to detecting the change in the budget from the refund credit applied to the budget, providing the purchase recommendation for display on the customer device.

2. The purchase recommendation system of claim 1, wherein the operations further comprise:
    providing, to the customer device, an insufficient budget notification associated with the selected item and the preferred benefit.

3. The purchase recommendation system of claim 1, wherein the budget includes a reward balance.

4. The purchase recommendation system of claim 1, wherein the budget of the financial information comprises account balance information.

5. The purchase recommendation system of claim 1, wherein the acceptance of the first benefit comprises a first conversion rate for the selected item, wherein the acceptance of the second benefit comprises a second conversion rate for the selected item and wherein the operations further comprise:
    sending, through a network to a merchant device associated with a merchant, a merchant offer request for the selected item and the preferred benefit; and
    in response to the sending, receiving a merchant offer associated with the selected item and the preferred benefit, wherein the purchase recommendation further comprises the merchant offer.

6. The purchase recommendation system of claim 1, wherein the purchase recommendation includes a buy button.

7. The purchase recommendation system of claim 6, wherein the buy button is configured to receive a user selection and cause a processing of a transaction for the selected item and the preferred benefit.

8. The purchase recommendation system of claim 1, wherein the purchase recommendation is provided through a text message.

9. A method for providing a purchase recommendation, comprising:
    monitoring, at intervals, a heartbeat cookie of a customer device associated with a customer;
    determining that the heartbeat cookie has expired without being replaced at one of the interval;
    determining, based on the heartbeat cookie expiring without being replaced at the one of the intervals, that the customer device has abandoned a shopping cart comprising a shopping list that includes a plurality of items associated with the customer;
    retrieving financial information associated with the customer,
        wherein the financial information comprises a conversion profile having first conversion data associated with an acceptance measure of a first benefit by the customer and second conversion data associated with an acceptance measure of a second benefit by the customer;
    determining a selected item from the shopping list;
    comparing the first conversion data with the second conversion data, wherein the first conversion data and the second conversion data are associated with the selected item;
    selecting a preferred benefit based on the comparing, wherein the preferred benefit is the first benefit if the first conversion data is greater than the second conversion data, or the preferred benefit is the second benefit if the second conversion data is greater than the first conversion data;

generating a purchase recommendation comprising the selected item and the preferred benefit;

determining a purchase amount associated with the selected item and the preferred benefit;

comparing the purchase amount to a budget of the financial information to determine if the purchase amount exceeds the budget of the financial information;

in response to a determination that the purchase amount exceeds the budget of the financial information, monitoring the budget to detect a change in the budget from a refund credit applied to the budget, wherein the change increases the budget to an amount that exceeds the purchase amount associated with the selected item and the preferred benefit; and in response to detecting the change in the budget from the refund credit applied to the budget, providing, for display on the customer device, the purchase recommendation.

10. The method of claim 9, further comprising:

providing to the customer device an insufficient budget notification associated with the selected item and the preferred benefit.

11. The method of claim 9, wherein the budget comprises reward balance information, and wherein the purchase recommendation is associated with a merchant.

12. The method of claim 9, wherein the budget comprises account balance information.

13. The method of claim 9, further comprising:

sending, through a network to a merchant device associated with a merchant, a merchant offer request for the selected item and the preferred benefit; and receiving a merchant offer associated with the selected item and the preferred benefit, wherein the purchase recommendation further comprises the merchant offer.

14. The method of claim 9, wherein the refund credit is from a merchant.

15. The method of claim 9, wherein the purchase recommendation includes a recommended funding resource.

16. A non-transitory computer-readable medium having machine-readable instructions executable to cause a machine to perform operations comprising:

monitoring, at intervals, a cookie of a customer device associated with a customer;

detecting that the cookie cannot be replaced at a certain interval of the intervals;

determining, based on the detecting, that the customer device has abandoned a shopping cart, and wherein the shopping cart comprises a shopping list including a plurality of items associated with the customer;

retrieving financial information associated with the customer, wherein the financial information comprises budget information and a conversion profile having a first benefit acceptance measure and a second benefit acceptance measure;

determining a selected item from the shopping list;

comparing the first benefit acceptance measure with the second benefit acceptance measure;

selecting a preferred benefit based on the comparing, wherein the preferred benefit is a first benefit if the first benefit acceptance measure is greater than the second benefit acceptance measure, or the preferred benefit is a second benefit if the second benefit acceptance measure is greater than the first benefit acceptance measure;

generating a purchase recommendation comprising the selected item and the preferred benefit;

determining a purchase amount associated with the selected item and the preferred benefit;

comparing the purchase amount to a budget of the financial information to determine if the purchase amount exceeds the budget of the financial information;

in response to a determination that the purchase amount exceeds the budget of the financial information, monitoring the budget to detect a change in the budget from a refund credit applied to the budget, wherein the change increases the budget to an amount that exceeds the purchase amount associated with the selected item and the preferred benefit; and in response to detecting the change in the budget from the refund credit applied to the budget, providing, for display on the customer device, the purchase recommendation.

17. The non-transitory computer-readable medium of claim 16, wherein the operations further comprise providing to the customer device an insufficient budget notification associated with the selected item and the preferred benefit.

18. The non-transitory computer-readable medium of claim 16, wherein the budget comprises a reward balance, and wherein the purchase recommendation is associated with a merchant.

19. The non-transitory computer-readable medium of claim 16, wherein the budget comprises account balance information.

20. The non-transitory computer-readable medium of claim 16, wherein the operations further comprise:

sending, through a network to a merchant device associated with a merchant, a merchant offer request for the selected item and the preferred benefit; and receiving from the merchant device, a merchant offer associated with the selected item and the preferred benefit, wherein the purchase recommendation further comprises the merchant offer.

* * * * *